United States Patent
Tagliasacchi et al.

(10) Patent No.: US 12,482,477 B2
(45) Date of Patent: Nov. 25, 2025

(54) MACHINE LEARNING FOR MICROPHONE STYLE TRANSFER

(71) Applicant: Google LLC, Mountain View, CA (US)

(72) Inventors: Marco Tagliasacchi, Kilchberg (CH); Beat Gfeller, Dubendorf (CH); Yunpeng Li, Zurich (CH); Zalán Borsos, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 241 days.

(21) Appl. No.: 18/249,126

(22) PCT Filed: Oct. 15, 2021

(86) PCT No.: PCT/US2021/055166
§ 371 (c)(1),
(2) Date: Apr. 14, 2023

(87) PCT Pub. No.: WO2022/081962
PCT Pub. Date: Apr. 21, 2022

(65) Prior Publication Data
US 2023/0395087 A1    Dec. 7, 2023

Related U.S. Application Data

(60) Provisional application No. 63/092,760, filed on Oct. 16, 2020.

(51) Int. Cl.
*G10L 21/007* (2013.01)
*G10L 15/06* (2013.01)
(Continued)

(52) U.S. Cl.
CPC .......... *G10L 21/007* (2013.01); *G10L 15/063* (2013.01); *G10L 15/08* (2013.01);
(Continued)

(58) Field of Classification Search
None
See application file for complete search history.

(56) References Cited

U.S. PATENT DOCUMENTS 9,813,810 B1 * 11/2017 Nongpiur .................. G06N 3/08
10,872,602 B2 * 12/2020 Nosrati .................... G06F 17/18
(Continued)

OTHER PUBLICATIONS

Mathur et al. "Mic2Mic: Using Cycle-Consistent Generative Adversarial Networks to Overcome Microphone Variability in Speech Systems". arXiv:2003.12425v1 [eess.AS] Mar. 27, 2020 (Year: 2020).*
(Continued)

*Primary Examiner* — Jesse S Pullias
(74) *Attorney, Agent, or Firm* — DORITY & MANNING P.A.

(57) ABSTRACT

Example implementations of the present disclosure relate to machine learning for microphone style transfer, for example, to facilitate augmentation of audio data such as speech data to improve robustness of machine learning models trained on the audio data. Systems and methods for microphone style transfer can include one or more machine-learned microphone models trained to obtain and augment signal data to mimic characteristics of signal data obtained from a target microphone. The systems and methods can include a speech enhancement network for enhancing a sample before the style transfer. The augmentation output can then be utilized for a variety of downstream tasks.

19 Claims, 12 Drawing Sheets

(51) Int. Cl.
  *G10L 15/08* (2006.01)
  *G10L 21/0208* (2013.01)
  *G10L 25/18* (2013.01)
  *G10L 25/21* (2013.01)
(52) U.S. Cl.
  CPC .......... *G10L 21/0208* (2013.01); *G10L 25/18* (2013.01); *G10L 25/21* (2013.01); *G10L 2015/088* (2013.01)

(56) References Cited

U.S. PATENT DOCUMENTS

| | | | |
|---|---|---|---|
| 10,943,602 B2* | 3/2021 | Chowdhary | H04R 1/406 |
| 2015/0287406 A1* | 10/2015 | Kristjansson | G10L 15/20 704/233 |
| 2021/0352406 A1* | 11/2021 | Sharma | G10L 25/78 |

OTHER PUBLICATIONS

Kosmider, Michal "Calibrating Neural Networks for Secondary Recording Devices". Detection and Classification of Acoustic Scenes and Events 2019 (Year: 2019).*
Su et al. "Acoustic Matching by Embedding Impulse Responses". ICASSP 2020, May 4-8, 2020, Barcelona, Spain. (Year: 2020).*
Mack et al. "Declipping Speech using Deep Filtering". 2019 IEEE Workshop on Applications of Signal Processing to Audio and Acoustics, Oct. 20-23, 2019, New Paltz, NY (Year: 2019).*
Siniscalchi et al. "Adaptation to New Microphones Using Artificial Neural Networks with Trainable Activation Functions". IEEE Transactions on Neural Networks and Learning Systems, vol. 28, No. 8, Aug. 2017 (Year: 2017).*
Wang et al. "Adaptive Frequency Response Calibration Method for Microphone Arrays". IEEE Sensors Journal, vol. 20, No. 13, Jul. 1, 2020 (Year: 2020).*
Martinez Ramirez et al. ("End-to-end Equalization with Convolutional Neural Networks". Proceedings of the 21st International Conference on Digital Audio Effects (DAFx-18), Aveiro, Portugal, Sep. 4-8, 2018 (Year: 2018).*
International Preliminary Report on Patentability for Application No. PCT/US2021/055166, mailed Apr. 27, 2023, 12 pages.
International Search Report for Application No. PCT/US2021/055166, mailed on Apr. 7, 2022, 4 pages.
Mathur et al., "Mic2Mic: Using Cycle-Consistent Generative Adversarial Networks to Overcome Microphone Variability in Speech Systems", Mar. 27, 2020, arxiv.org, XP081630883, 12 pages.
Acero et al., "Environmental Robustness in Automatic Speech Recognition.", International Conference on Acoustics, Speech, and Signal Processing, Albuquerque, New Mexico, United States, Apr. 3-6, 1990, pp. 849-852.
Acero, "Acoustical and Environmental Robustness in Automatic Speech Recognition.", Carnegie Mellon University, Ph.D. Dissertation, 1991, 153 pages.
Engel et al., "DDSP: Differentiable Digital Signal Processing.", arXiv:2001.04643v1, Jan. 14, 2020, 19 pages.
Garofolo et al., "DARPA TIMIT Acoustic-Phonetic Continuous Speech Corpus CD-ROM., National Institute of Standards and Technology Speech Disc 1-1.1", Feb. 1993, 94 pages.

Kingma et al., "ADAM: A Method for Stochastic Gradient Descent.", arXiv:1412.6980v9, Jan. 30, 2017, 15 pages.
Kotropoulos et al., "Mobile Phone Identification Using Recorded Speech Signals.", 2014 Nineteenth International Conference on Digital Signal Processing, Hong Kong, China, Aug. 20-23, 2014, pp. 586-591.
Kraetzer et al., "Digital Audio Forensics: A First Practical Evaluation on Microphone and Environment Classification.", MM & Sec '07: Ninth Workshop on Multimedia & Security, Sep. 20-21, 2007, pp. 63-74.
Kumar et al., "MelGAN: Generative Adversarial Networks for Conditional Waveform Synthesis.", arXiv:1910.06711v3. Dec. 9, 2019, 14 pages.
Li et al., "Learning to Denoise Historical Music.", arXiv:2008.02027v2, Jun. 16, 2022, 8 pages.
Mathur et al., "Mic2Mic: Using Cycle-Consistent Generative Adversarial Networks to Overcome Microphone Variability in Speech Systems,", arXiv:2003.12425v1, Mar. 27, 2020, 12 pages.
Mathur et al., "Using Deep Data Augmentation Training to Address Software and Hardware Heterogeneities in Wearable and Smartphone Sensing Devices.", Seventeenth Association for Computing Machinery and Institute of Electrical and Electronics Engineers International Conference on Information Processing in Sensor Networks (IPSN), Porto, Portugal, Apr. 11-13, 2018, pp. 200-211.
MicIRP, "Microphone Impulse Response Project.", Feb. 7, 2017, http://micirp.blogspot.com, retrieved on Sep. 6, 2023, 4 pages.
Panayotov et al., "Librispeech: An ASR Corpus Based on Public Domain Audio Books.", 2015 Institute of Electrical and Electronics Engineers International Conference on Acoustics, Speech, and Signal Processing (ICASSP), South Brisbane, Queensland, Australia, Apr. 19-24, 2015, pp. 5206-5210.
Stockham et al., "Blind Deconvolution through Digital Signal Processing.", Institute of Electrical and Electronics Engineers, Apr. 1975, vol. 63, No. 4, pp. 678-692.
Tagliasacchi et al., "SEANet: A Multi-modal Speech Enhancement Network.", arXiv:2009.02095v2, Oct. 1, 2020, 5 pages.
Verma et al., "CNN-based System for Speaker Independent Cell-Phone Identification from Recorded Audio.", Institute of Electrical and Electronics Engineers /Computer Vision Foundation Conference on Computer Vision and Pattern Recognition Workshops, 2019, pp. 53-61.
Warden, "Speech Commands: A Dataset for Limited-Vocabulary Speech Recognition.", arXiv:1804.03209v1. Apr. 9, 2018, 11 pages.
Wolfel, "Enhanced Speech Features by Single-Channel Joint Compensation of Noise and Reverberation.", Institute of Electrical and Electronics Engineers Transactions on Audio, Speech, and Language Processing, vol. 17, No. 2, Feb. 2009, pp. 312-323.
Yamagishi et al., "Corpus: English Multi-Speaker Corpus for CSTR Voice Cloning Toolkit. (version 0.92).", Nov. 13, 2019, https://datashare.ed.ac.uk/handle/10283/3443, retrieved on Sep. 6, 2023, 2 pages.
Zhao et al., "Robust Speaker Identification in Noisy and Reverberant Conditions.", 2014 Institute of Electrical and Electronics Engineers/Association for Computing Machinery Transactions on Audio, Speech, and Language Processing, (ICASSP), Florence, Italy, May 4-9, 2014, pp. 3997-4001.
Zhu et al., "Unpaired Image-to-Image Translation using Cycle-Consistent Adversarial Networks.", arXiv:1703.10593v7, Aug. 24, 2020, 18 pages.

* cited by examiner

MACHINE LEARNING FOR MICROPHONE STYLE TRANSFER

RELATED APPLICATIONS

This application is based upon and claims the right of priority under 35 U.S.C. § 371 to International Application No. PCT/US2021/055166 filed on Oct. 15, 2021, which claims priority to and the benefit of U.S. Provisional Patent Application No. 63/092,760, filed Oct. 16, 2020. Applicant claims priority to and the benefit of each of such applications and incorporate all such applications herein by reference in its entirety.

FIELD

The present disclosure relates generally to machine learning for microphone style transfer. More particularly, the present disclosure relates to machine learning for microphone style transfer to, for example, facilitate augmentation of audio data such as speech data to improve robustness of machine learning models.

BACKGROUND

Recent advances in audio recognition models have produced significant performance improvements in a number of tasks. Yet these systems suffer from serious performance degradation when encountering domain shift (e.g., changes in the characteristics of input data such as changes due to the use of different microphone(s) to collect the input audio data). This is often the case in practice: the deployed models face audio data collected in various environments by heterogeneous devices, each characterized by different hardware and signal processing pipelines.

A prominent approach for tackling domain shift is the development of models which demonstrate improved robustness against domain shift such as microphone variability. In the speech recognition community, the topic of model robustness has a long history.

Concerning the robustness to microphone variability, it has been noted that the performance is significantly affected when inference is performed on audio captured by microphones that differ from the ones used for collecting the training set. To mitigate this issue, certain existing approaches use additive corrections in the cepstral domain while others perform multi-style training using a collection of microphones. One limitation of the former method is that it is compatible only with applications operating on inputs in the cepstral domain, while the latter method assumes availability of data from multiple microphones during training time.

In another example approach, a mapping is learned between microphones using CycleGAN. While this method neither requires paired data nor imposes constraints on the type of microphone transformations it models, it relies on training from scratch a separate CycleGAN for every microphone type encountered during test time, which introduces a significant computational overhead during deployment. Moreover, even for simple keyword detection tasks, it requires several minutes of unpaired training data per microphone. The method also inherits the weaknesses of CycleGAN, e.g., mapping completely unrelated samples in source and target domains.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for microphone-style transfer (that can be, for modifying a set of audio data accurately representing a sample of sound, into audio data representative of audio data output by a certain microphone upon receiving the sample of sound). The method can include obtaining, by a computing system including one or more computing devices, input audio data collected by a first microphone. The method can include processing, by the computing system, the input audio data with a machine-learned microphone model to generate predicted target audio data for a target microphone that is different from the first microphone. Processing, by the computing system, the input audio data with the machine-learned microphone model can include determining, by the computing system, first signal data based at least in part the audio data and machine-learned impulse response data of the machine-learned microphone model and processing, by the computing system, the first signal data with a machine-learned power-frequency model of the machine-learned microphone model to produce second signal data, in which the machine-learned power-frequency model models one or more frequency band cutouts.

The machine-learned microphone model may be employed, for example, to generate training data for training an adaptive system (machine learning system), e.g., for recognizing speech, such as recognizing at least one pre-defined word or phrase within the speech. The method may include performing this training operation, and optionally carrying out speech recognition on samples of sound collected by microphones using the trained speech recognition system. This aspect of the disclosure may alternatively be expressed as one or more non-transitory computer readable media that collectively store instructions that, when executed by one or more processors, cause the processors to perform the method. It may also be expressed as a computer system incorporating one or more processors and the one or more non transitory computer readable media. In some implementations, processing, by the computing system, the input audio data with the machine-learned microphone model can include processing, by the computing system, a noise signal with a machine-learned filter to generate filtered noise data and combining, by the computing system, the filtered noise data with the second signal data to generate third signal data. Processing, by the computing system, the input audio data with the machine-learned microphone model can include processing, by the computing system, the second signal or the third signal with a machine-learned clipping model to generate clipped data, in which the clipped data can include the predicted target audio data. The input audio data can include an unaugmented training example, and the predicted target audio data can include an augmented training example. In some implementations, the method can include training an audio processing model using the augmented training example.

In some implementations, the impulse response data can include room reverb impulse response data. The room reverb impulse response data can be based at least in part on a room where the microphone is located. The machine-learned power-frequency model can apply one or more short-term Fourier transforms (that can be, a Fourier transform which is different for different segments of the input audio data, where the segments can be obtained by partitioning the input audio data in the time domain; the machine-learned power-frequency model may multiply each frequency component of the Fourier transform with the corresponding component of frequency-domain data for the corresponding segment of the input audio data). In some implementations, the one or more frequency band cutouts can be based at least in part on a power spectral density. The noise signal can include a white Gaussian noise signal. The machine-learned clipping model can apply a learned maximum absolute value for a waveform. In some implementations, the machine-learned clipping model can include a smoothed minimum function and a smoothed maximum function. The machine-learned power-frequency model can include a sigmoid activation function.

Another example aspect of the present disclosure is directed to a computer system that includes one or more processors and one or more non-transitory computer readable media that collectively store instructions that, when executed by the one or more processors, cause the computing system to perform operations. The operations can include obtaining a training target audio signal. The operations can include processing the training target audio signal with a speech enhancement model to generate a source audio signal, in which the source audio signal can include refined audio data. The operations can include processing the source audio signal with a machine-learned microphone model to generate a predicted target audio signal. The operations can include evaluating a loss function that compares the predicted target audio signal to the training target audio signal. The operations can include modifying one or more values of one or more parameters of the machine-learned microphone model based on the loss function. The machine-learned microphone model may be employed, for example, for generating training data for training an adaptive system, e.g., for recognizing speech. The recording media may comprise instructions which cause the processors to perform this training operation, and optionally the operation of carrying out speech recognition on samples of sound collected by microphones using the trained speech recognition system. This aspect of the disclosure may alternatively be expressed as the one or more non-transitory computer readable media, or as a method comprising the operations.

In some implementations, the operations can include employing the machine-learned microphone model to perform augmentations to a training dataset. The operations can include training a keyword recognition model using the augmented training dataset. Obtaining the training target audio signal can include augmenting audio data based at least in part on simulated microphone augmentation to generate simulated target data. In some implementations, the simulated target data can include the training target audio signal. Evaluating the loss function can include: generating a predicted target spectrogram from the predicted target audio signal, generating a training target spectrogram from the training target audio signal, and comparing the predicted target spectrogram with the training target spectrogram.

Another example aspect of the present disclosure is directed to one or more non-transitory computer readable media that collectively store instructions that, when executed by one or more processors, cause a computing system to perform operations. The operations can include obtaining style transfer training data comprising a source audio signal and a training target audio signal associated with a target microphone style (e.g., an audio signal representative of the signal which the target microphone outputs upon receiving a sound signal; that can be, including any artefacts the target microphone applies to the sound signal). The operations can include processing the source audio signal with a machine-learned microphone model to generate a predicted target audio signal. The machine-learned microphone model can include one or more of: a machine-learned impulse response; a machine-learned power-frequency model; a machine-learned noise input filter; or a machine-learned clipping function. The operations can include evaluating a loss function that compares the predicted target audio signal to the training target audio signal. The operations can include modifying one or more values of one or more parameters of the machine-learned microphone model based on the loss function. The machine-learned microphone model may be employed, for example, for generating training data for training an adaptive system for recognizing speech. The recording media may comprise instructions which cause the processors to perform this training operation, and optionally the operation of carrying out speech recognition on samples of sound collected by microphones using the trained speech recognition system. This aspect of the disclosure may alternatively be expressed as a computer system including one or more processor and the one or more non-transitory computer readable media, or as a method comprising the operations.

In some implementations, evaluating the loss function can include: generating a predicted target spectrogram from the predicted target audio signal, generating a training target spectrogram from the training target audio signal, and comparing the predicted target spectrogram with the training target spectrogram. The operations can include employing the machine-learned microphone model to perform augmentations to a training dataset. In some implementations, the operations can include training a keyword recognition model using the augmented training dataset.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
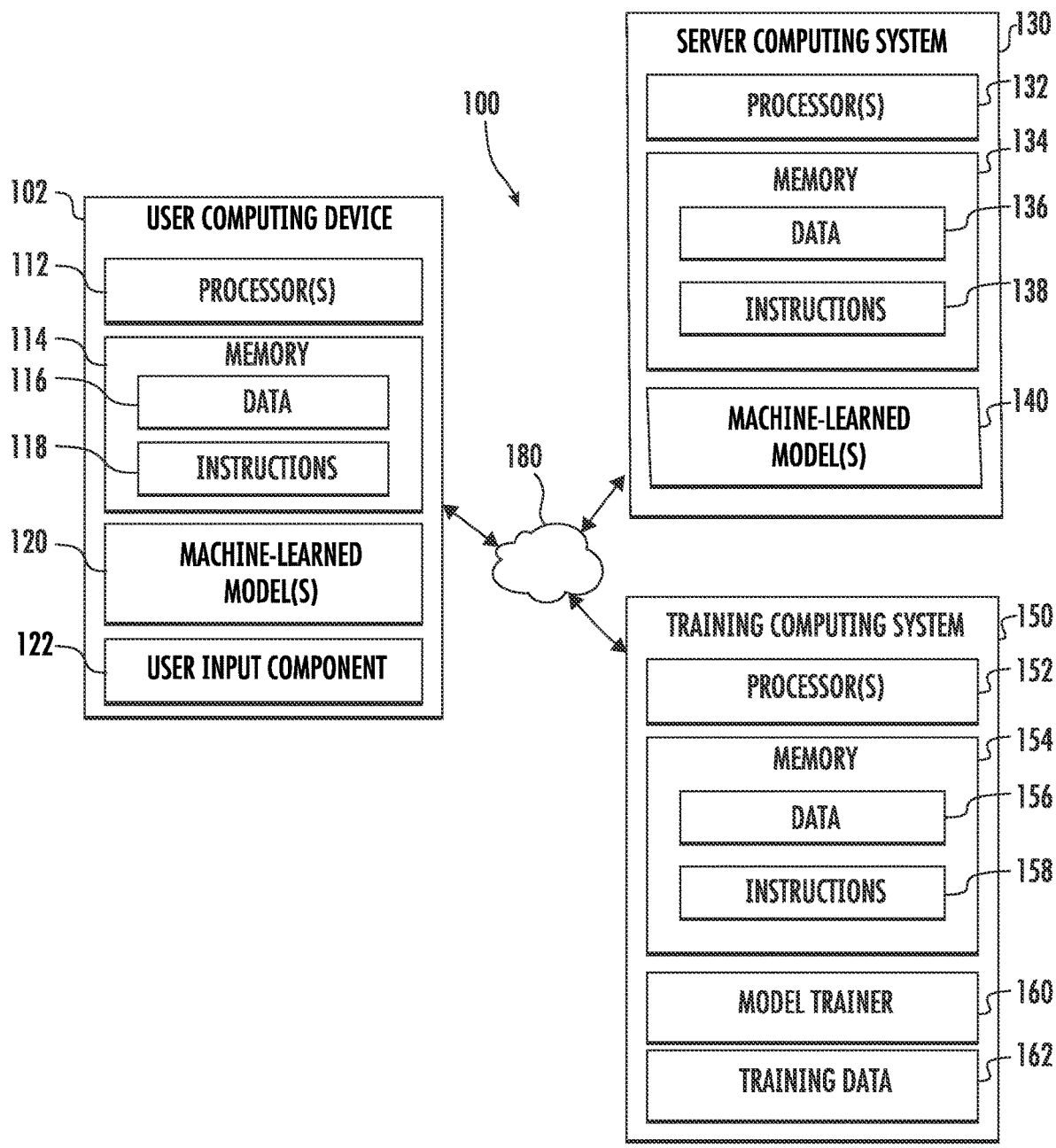
FIG. 1A depicts a block diagram of an example computing system that performs microphone style transfer according to example embodiments of the present disclosure.

Reference numerals that are repeated across plural figures are intended to identify the same features in various implementations.

DETAILED DESCRIPTION

Overview

Example implementations of the present disclosure relate to machine learning for microphone style transfer to, for example, facilitate augmentation of audio data such as speech data to improve robustness of machine learning models trained on the audio data. In particular, a critical aspect for the successful deployment of audio-based models "in-the-wild" can be the robustness to the transformations introduced by heterogeneous microphones. Aspects of the present disclosure enable improved model robustness (e.g., to microphone variability) by generating augmented training data in which the training data can be augmented to reflect different potential microphone transformations. In particular, in some implementations, the systems and methods can be able to perform one-shot microphone style transfer to learn a microphone transformation on only a single example of data from the microphone. Specifically, given only a few seconds of audio recorded by a target device, example implementations of the present disclosure can identify the transformations associated with the microphone and can use the learned transformations to synthesize audio as if the audio was recorded by that device. The systems and methods can successfully apply these transformations to real audio or other audio included in training data, and that transformation can significantly increase model robustness to microphone variability when used as data augmentation in downstream tasks.

In particular, some example implementations of the present disclosure can be referred to as "MicAugment." The MicAugment systems and methods can perform few-shot (e.g., one-shot) microphone style transfer. The MicAugment systems and methods may include a machine-learned microphone model and, in some instances, a speech enhancer model. The microphone model can learn to approximate a transformation associated with microphone variability. For example, the microphone model can be trained to alter a source audio signal to produce a predicted target audio signal, where the predicted target audio signal sounds as if it were captured or recorded by a target microphone.

In some implementations, the microphone model may obtain and/or receive audio input data and may process and/or transform the audio input data using impulse response data, a power-frequency model, a filtering model, and/or a clipping model. Some or all of the impulse response data, the power-frequency model, the filtering model, and/or the clipping model may include and/or apply machine-learned parameter values that are learned according to the training processes described herein.

For example, the systems and methods can include obtaining input audio data collected and/or generated by a first microphone (e.g., a source). The input audio data can include speech data or another form of audio data. The input audio data can then be processed with a machine-learned microphone model to generate predicted target audio data. The predicted target audio data can include audio data from the input audio data transformed to mimic the style of audio data generated by a second microphone (e.g., a target microphone). The first microphone and the target microphone can be different microphones. For example, the first microphone can be a dynamic microphone, and the target microphone can be a large diaphragm condenser microphone, or vice versa. Additionally and/or alternatively, the first microphone and the target microphone may be of the same microphone type (e.g., a dynamic microphone, a large diaphragm condenser microphone, a small diaphragm condenser microphone, a ribbon microphone, etc.).

Processing the input audio data with the machine-learned microphone model can include determining first signal data based at least in part on the audio data and machine-learned impulse response data of the machine-learned microphone model. The first signal data can be processed with a machine-learned power-frequency model of the machine-learned microphone model in order to produce, or generate, second signal data. The machine-learned power-frequency model can be trained to model one or more frequency band cutouts.

In some implementations, a first step of the microphone model may include comparing, e.g., convolving, audio input and impulse response data. Impulse response data may be data collected on the impulse response of a particular microphone or a set of microphones and/or may be learned as part of a learning process performed to learn the microphone model. The comparison can be used to generate first signal data. The first signal data can then be processed with a power-frequency model that models one or more frequency band cutouts to generate second signal data. The power-frequency model may use power spectral density data and Fourier transforms (e.g., which include or apply learned values) to generate the second signal data. For example, the Fourier transforms may include short-time Fourier transforms.

A white noise signal can be processed by a filtering model (e.g., using a learned filter) to generate filtered noise data. The white noise signal may include a white Gaussian noise signal (e.g., with learned Gaussian parameters). The filtering model may include convolving the white signal noise and the one or more frequency band cutouts and/or performing additive operations to add the noise to the signal. For example, the filtered noise data can be added to the second signal data to generate third signal data. A last step of the microphone model can include processing the filtered data with a clipping model to generate clipped data. For example, the clipping model can apply a learned clipping threshold value. The output of the microphone model can be a predicted target audio signal. For example, the clipped data can be output as the predicted target audio signal.

In some implementations, training of the microphone model can include processing paired audio samples, in which the paired audio samples include source data and training target data. In particular, the source data may be processed by the microphone model to predict target data. The predicted target data may be used to generate a predicted target spectrogram. The training target data can be used to generate a training target spectrogram. In some implementations, the spectrograms may include mel spectrograms. The predicted target spectrogram and the training target spectrogram can be compared to evaluate a loss function. As one example, the loss function may include the mean absolute error of the comparison and/or other distances or difference measures. In response to the evaluation of the loss function, the parameters of the microphone model (e.g., an impulse response, a power-frequency model, a filtering model, and/or a clipping model) may be modified (e.g., via backpropagation of the loss function).

In some implementations, which can be referred to as operating in a "paired" setting, the source audio signal and a training version of the target audio signal can be separately generated and both available. For example, two demonstrations of the same audio can be separately captured by two different microphones (e.g., a higher quality microphone to create a "clean" source sample and a lower quality microphone to create the training target audio signal). As indicated above, the microphone model can be trained to transform the source audio signal into the predicted target audio signal such that the predicted target audio signal matches the training target audio signal.

In other implementations, which may be referred to as operating in an "unpaired" setting (which is much more common), only one of the source audio signal or the training audio signal may be available. In some of such cases, such as when only the training target signal is available, a speech enhancer model can be used to enhance the training audio signal to produce the "clean" source audio signal. For example, the speech enhancer model can invert or remove a microphone transformation encountered in a target domain, thereby producing a sample containing clean speech. After using the speech enhancer to generate the source audio signal from the training target audio signal, the microphone model can be trained as described above—in effect learning to invert the speech enhancement. Thus, the microphone model and speech enhancer model can operate in tandem to allow the systems and methods to train the microphone model to output or perform a transformation that modifies the source samples to sound as if the samples were recorded by a target microphone.

In some implementations, the speech enhancer model may use microphone impulse responses, room reverberation impulse responses, and noise segments to aid in performing blind deconvolution and denoising.

In yet further implementations, the training audio signal(s) can be synthesized by selecting (e.g., randomly or pseudo-randomly) different parameter values for the microphone model from a set of candidate values (e.g., values observed from different real-world microphones). This can create a set of training target signals which mimic audio signals captured by different microphones. These training target signals can then be used as described above.

Thus, in some implementations, microphone impulse responses, room reverberation impulse responses, and noise segments may be used to process or generate synthetic datasets. The synthetic datasets may be split into mini-batches. Each mini-batch may be convolved with a randomly chosen reverb impulse response to generate a first output. The first output can then be convolved with a randomly chosen microphone impulse response to produce a signal. The signal may then be divided by the frequency range, and the divided segment may be sampled against a threshold to generate a second output. Randomly chosen noise samples may be added to the second output to generate a third output. The third output may then be clipped to generate the final enhanced audio data. The final enhanced audio data may be used as source data for the microphone model.

Thus, example aspects of the present disclosure provide solutions to the following problem: given a few seconds of audio recorded by a target microphone, transform other audio samples to sound as if they were recorded by the target microphone. To this end, with a focus on speech data, the present disclosure provides MicAugment, a machine-learning approach to few-shot (e.g., one-shot) microphone style transfer. Operating in the time-domain, the method can be agnostic to the downstream tasks, and hence widely applicable. MicAugment can be used as a data augmentation method to improve the model robustness to domain shifts due to microphone variability. Two important elements in achieving this can be the recent advances in speech enhancement and a novel non-linear microphone model, which, by incorporating strong priors capturing the microphone signal processing pipeline, enables fast model identification.

The systems and methods of the present disclosure provide a number of technical effects and benefits. As one example, the present disclosure provides a lightweight microphone model based on strong priors. Because of the lightweight nature of the model, it can be learned using just a few seconds of audio from a target device. As another example technical effect, when used to perform data augmentation, the systems and methods of the present disclosure can significantly increase model robustness to microphone variability. As yet another example technical effect, the microphone model can be used in adversarial training to boost model robustness. More robust models can provide consistent model performance when exposed to distributional shift (e.g., microphone variability), thereby obviating the need to train a new model for every different setting (e.g., different microphone). Obviating the need to train many different models can conserve computing resources such as processor usage, memory usage, and network bandwidth usage.

With reference now to the Figures, example embodiments of the present disclosure will be discussed in further detail.

Example Devices and Systems

FIG. 1A depicts a block diagram of an example computing system 100 that performs microphone style transfer according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some implementations, some of these devices may have limited processing and memory capacity, so it is important that they can operate with a reduced requirement for processing operations or data storage.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more microphone models 120. For example, the microphone models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example microphone models 120 are discussed with reference to FIGS. 2-5.

In some implementations, the one or more microphone models 120 can be received from the server computing system 130 over network 180, stored in the user computing device memory 114, and then used or otherwise implemented by the one or more processors 112. In some implementations, the user computing device 102 can implement multiple parallel instances of a single microphone model 120 (e.g., to perform parallel synthetic data generation across multiple instances of microphone styles).

More particularly, the microphone model can be utilized to transfer microphone styles to audio data to generate synthetic data to be used to train other models such as speech command models.

Additionally or alternatively, one or more microphone models 140 can be included in or otherwise stored and implemented by the server computing system 130 that communicates with the user computing device 102 according to a client-server relationship. For example, the microphone models 140 can be implemented by the server computing system 140 as a portion of a web service (e.g., a synthetic audio data generation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components can include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned microphone models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the microphone models 120 and/or 140 based on a set of training data 162. The training data 162 can include, for example, processing source data with a microphone model to generate processed source data. The processed source data may then be used to generate a predicted target spectrogram. The predicted target spectrogram may then be compared to a target spectrogram to evaluate a loss function. The loss function may then be used to modify parameters of the microphone model.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be speech data. The machine-learned model(s) can process the speech data to generate an output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a prediction output.

In some implementations, the input to the machine-learned model(s) of the present disclosure can be latent encoding data. The machine-learned model(s) can process the latent encoding data to generate an output. As another example, the machine-learned model(s) can process the latent encoding data to generate a reconstruction output.

In some implementations, the input to the machine-learned model(s) of the present disclosure can be sensor data. The machine-learned model(s) can process the sensor data to generate an output. As another example, the machine-learned model(s) can process the sensor data to generate a segmentation output. As another example, the machine-learned model(s) can process the sensor data to generate a visualization output.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
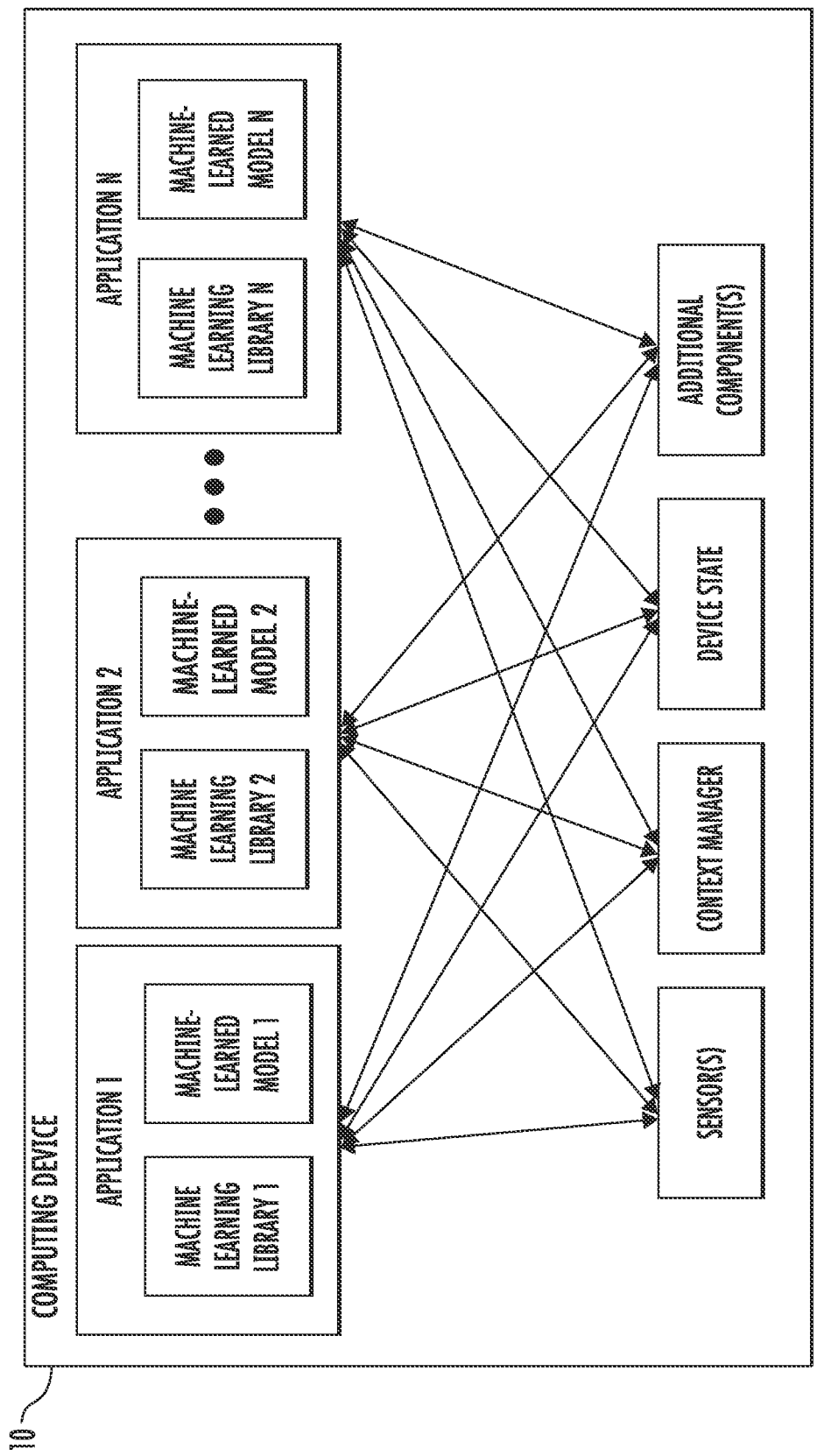
FIG. 1B depicts a block diagram of an example computing device that performs microphone style transfer according to example embodiments of the present disclosure.

FIG. 1B depicts a block diagram of an example computing device 10 that performs according to example embodiments of the present disclosure. The computing device can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
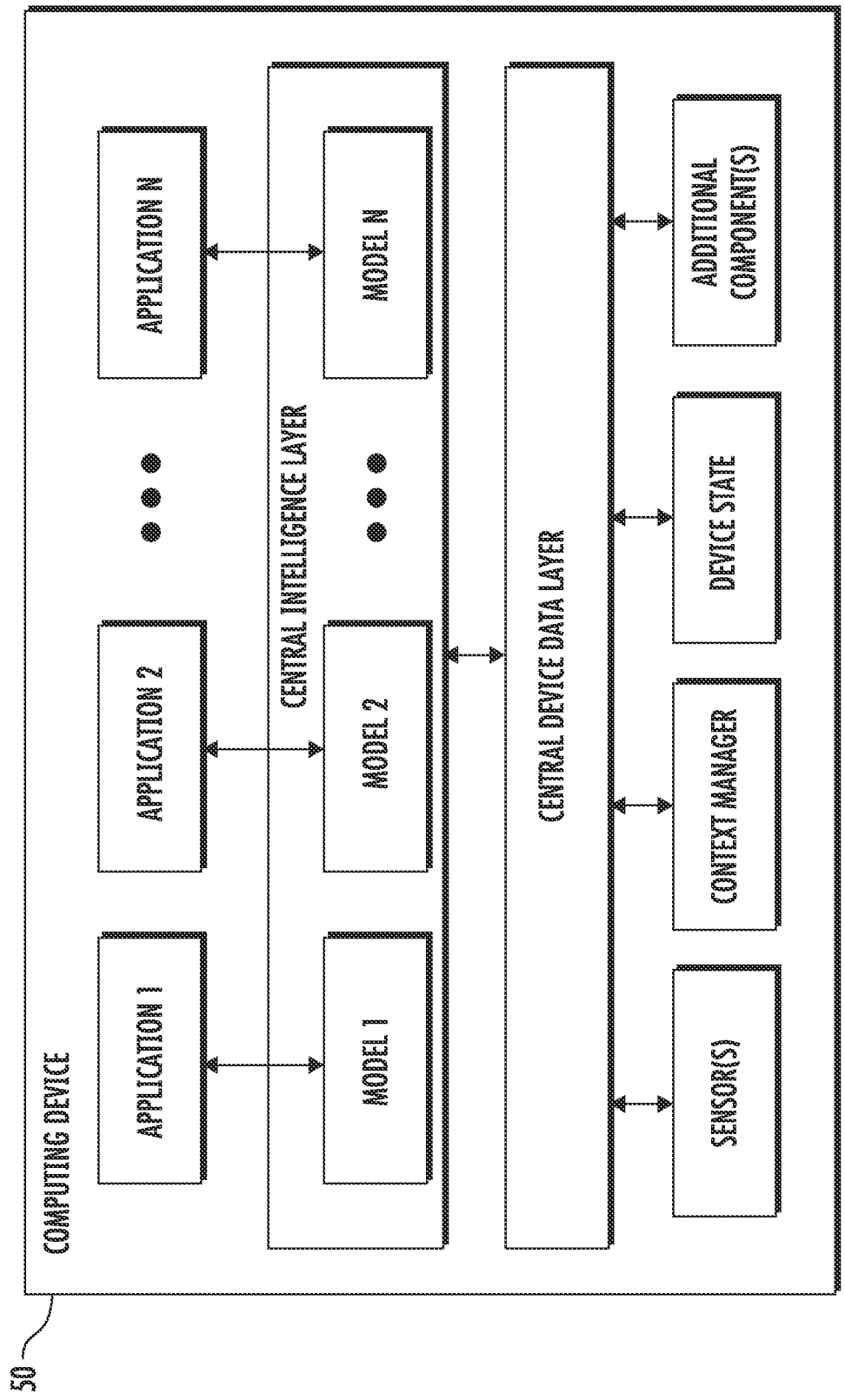
FIG. 1C depicts a block diagram of an example computing device that performs microphone style transfer according to example embodiments of the present disclosure.

FIG. 1C depicts a block diagram of an example computing device 50 that performs according to example embodiments of the present disclosure. The computing device can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
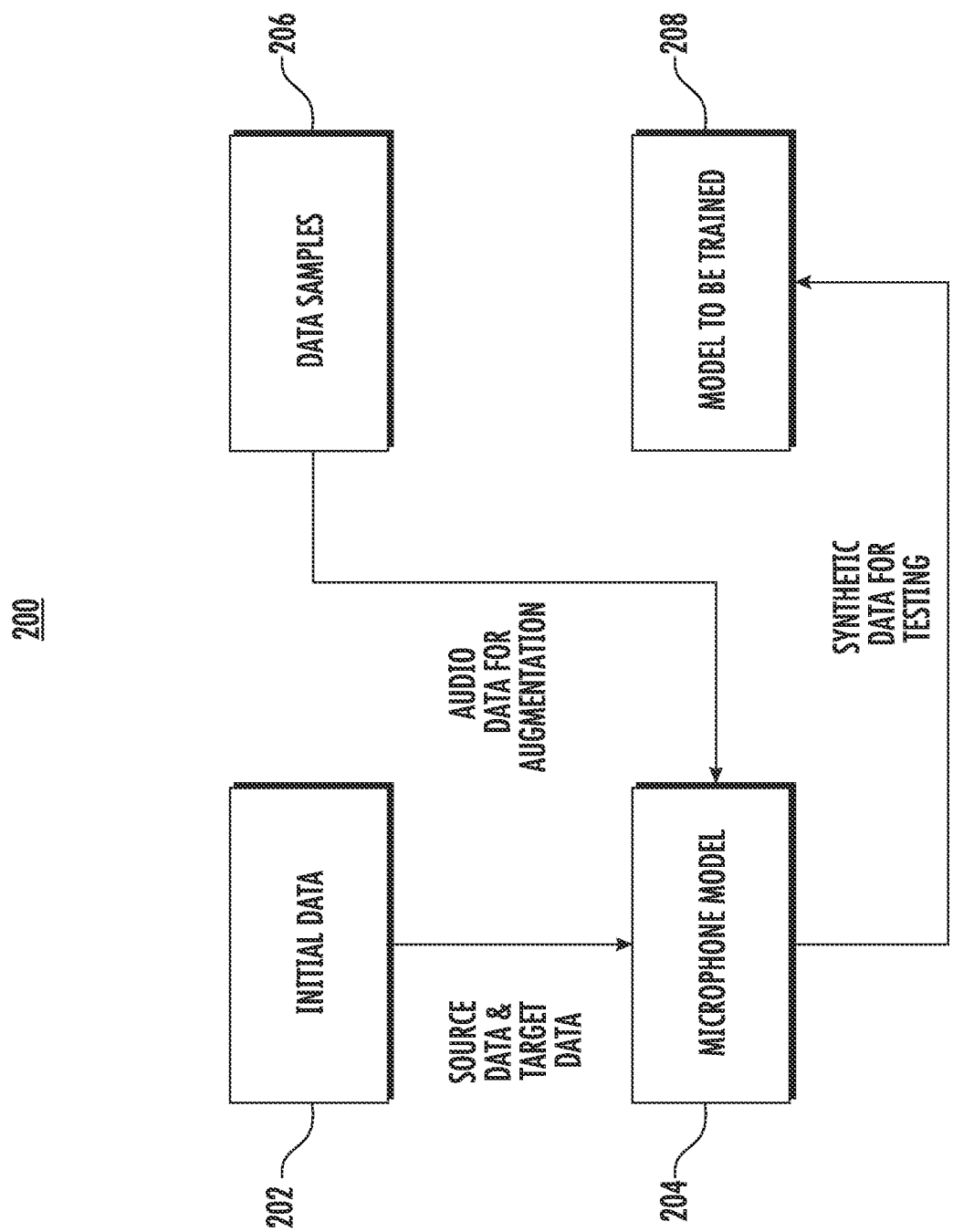
FIG. 2 depicts a block diagram of an example generation of synthetic data for model training using a microphone model according to example embodiments of the present disclosure.

FIG. 2 depicts a block diagram of an example system 200 for generating augmented training data using a microphone model 204 according to example embodiments of the present disclosure. In some implementations, the microphone model 204 is trained using initial training data 202. Once trained, the microphone model 204 can be used to augment data samples 206 to generate augmented training data which can be used to train another model 208.

Thus, FIG. 2 depicts an illustration of one implementation of the generation of augmented audio data for training models. The microphone model 204 may be used to generate synthetic data that can be used to train other models 208. One example model that could benefit from the synthetic data would be a speech recognition model that, for example, processes audio data to determine if a key word, or command, is in the audio data. The microphone model can allow for the generation of new augmented data with added noise or other microphone transformations corresponding to microphone variability.

In this illustration of FIG. 2, there are initial training data sets 202. The data sets can be source data and target data from paired sets of data. In some implementations, the data sets may include "unpaired" target data and source data generated by a speech enhancer model. The training data 202 can in some examples be real world data collected "in the wild."

In this implementation 200, the microphone model 204 obtains or intakes source data and target data from the initial data 202 source. The microphone model 204 processes the source data and target data to learn to generate microphone style transferred data. The generated microphone style transferred data may include the microphone style of the target data transferred to the source data.

Once trained, the microphone model 204 can be used to generate augmented data based on one or more data samples of an audio bank 206 or other training dataset. The augmented data can then be used as training data for a model 208. The model 208 may be any form of audio processing model such as, in one example, a speech recognition model that may process audio data to determine if a key word or phrase is in the audio data. The augmented data may include the key word or phrase in a data file that has the microphone style transferred to the data based on the audio augmentation data output or performed by the microphone model 204. The training of the model 208 may further employ content data which indicates, for each item of augmented data, whether that augmented data includes one or more words (e.g., the key word or phrase). This content data may be obtained from corresponding content data included in the initial data 202 which indicates whether each item of the source data or target data includes the one or more words. Thus, the model 208 may be trained by a supervised learning algorithm.

Figure 3:
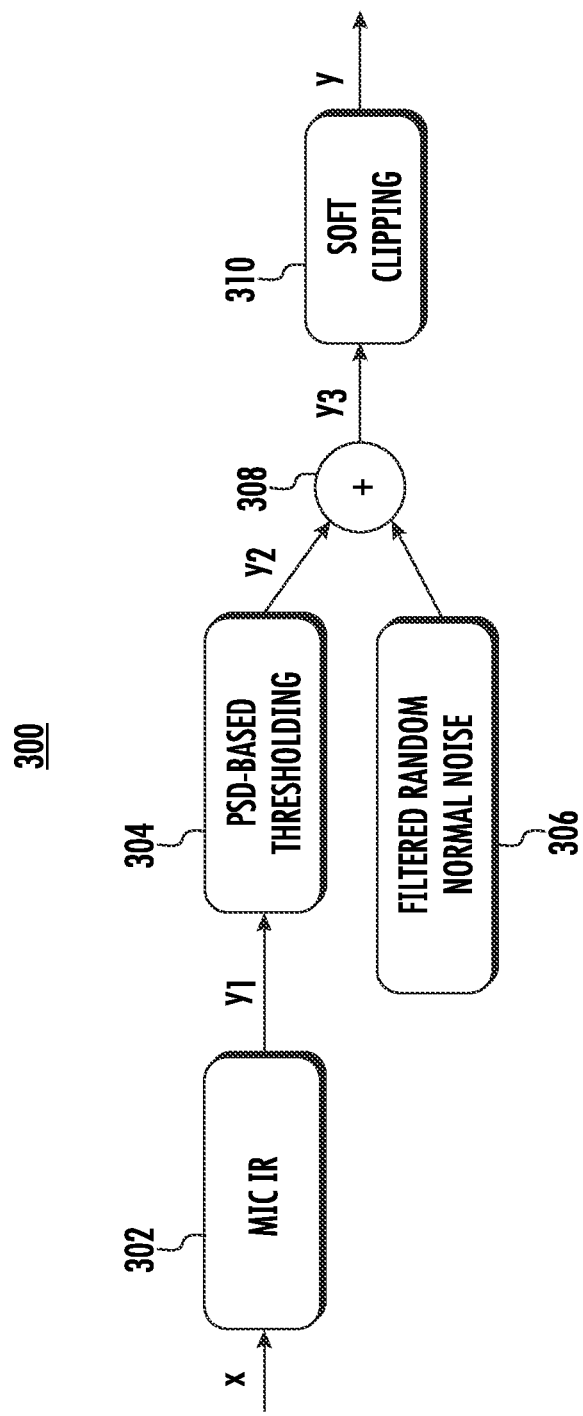
FIG. 3 depicts a block diagram of an example microphone model according to example embodiments of the present disclosure.

FIG. 3 depicts an illustration of one example implementation of the microphone model. The microphone model 300 may obtain audio data x as input and output a microphone style transferred data y. In this implementation, the microphone model 300 obtains the audio data and convolves the input time-domain waveform of the audio data with microphone impulse response data 302. The microphone impulse response may in some instances also include room reverberation impulse response. The resulting output $y_1$, or first signal, can then be processed by a component 304 of the microphone model that models frequency band cutouts of the microphone based on the power spectral density to generate a second signal $y_2$. The component 304 may be a power-frequency model that may include short-term Fourier transforms.

In this implementation, the microphone model includes a filter model 306 in which white Gaussian noise signal is convolved with a learned filter. The resulting convolved data may then be added 308 to the second signal $y_2$ to generate a third signal $y_3$. The third signal can then be processed by a clipping model 310 to generate clipped data. The clipped data may be or include microphone style transferred data y.

Figure 4:
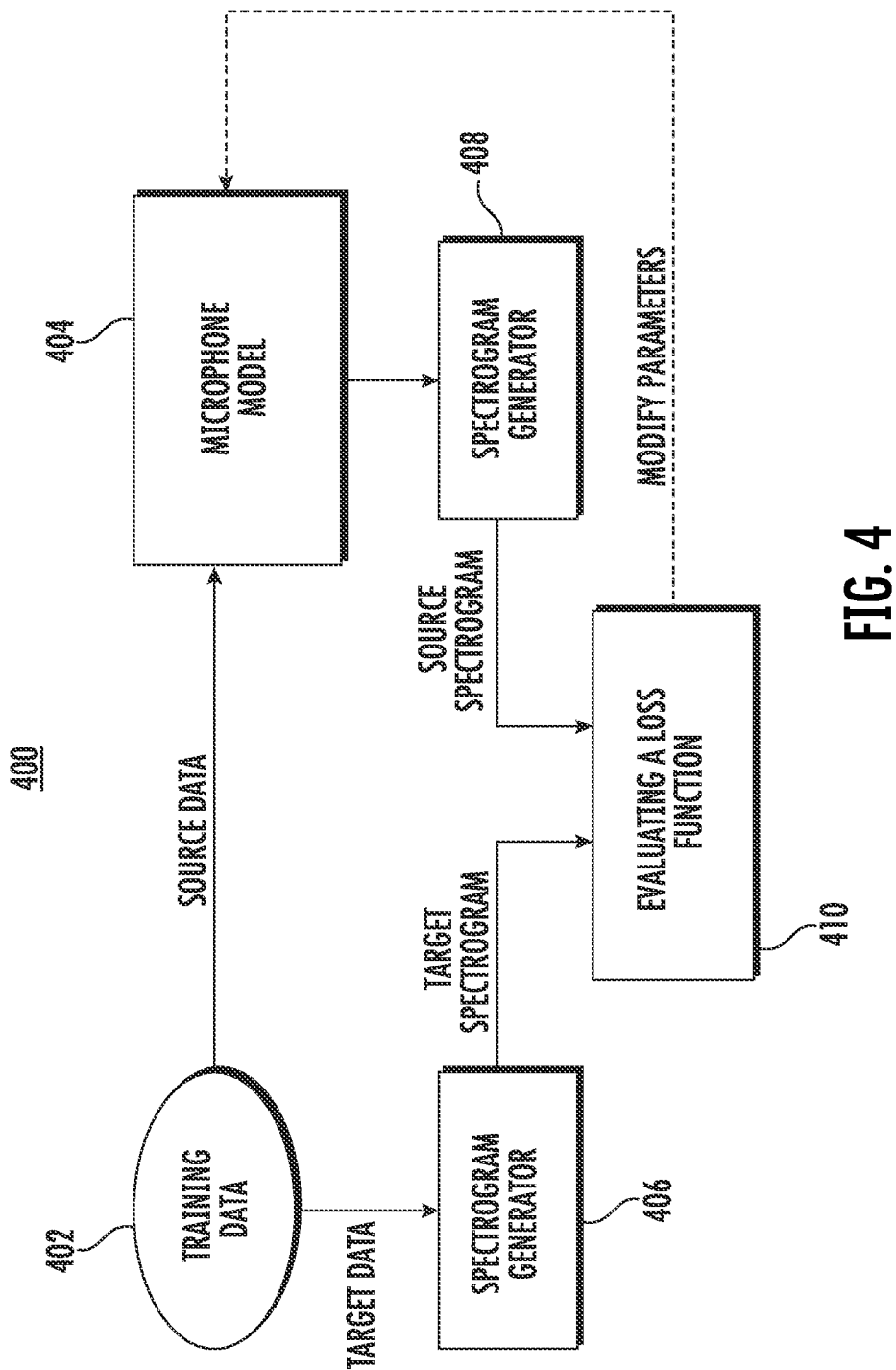
FIG. 4 depicts a block diagram of an example training of the microphone model according to example embodiments of the present disclosure.

FIG. 4 depicts an illustration of one implementation of the system for training the microphone model. A microphone model 404 may be trained using training data 402 that includes source data and target data. In this implementation, the source data is processed by the microphone model 404 to generate microphone style transferred data. In some implementations, one or more spectrograms are generated 406 for the target data. In some implementations, one or more spectrograms are generated 408 for the microphone style transferred data. The predicted target spectrogram generated based on the microphone style transferred data may be compared to the target spectrogram. The comparison may be used to evaluate 410 a loss function.

The source data from the training data 402 may be clean waveform data (e.g., data generated by a high-quality microphone and substantially without artefacts due to the microphone or data in which the artefacts generated by a particular microphone are removed or minimized), while the target data of the training data 402 may be data collected by a microphone with microphone variability. The microphone model 404 may be configured to transfer the microphone style of the target data to the source data. The microphone model 404 may convolve the source waveform data with microphone impulse response data, process the resulting data with a power-frequency model, a filtering model, and a clipping model to generate clipped data with a desired microphone variability. The clipped data may be used to generate 408 a predicted target spectrogram. In some implementations, a target spectrogram may be generated 406 to compare with the predicted target spectrogram. The comparison being used to evaluate the loss function 410 may include determining the mean absolute error between the predicted target spectrogram and the target spectrogram.

In this implementation, one or more parameters of the microphone model 404 can be modified in response to the evaluation of the loss function. Parameters of the impulse response, power-frequency model, the filter model, and/or the clipping model may be modified in response to the comparison (e.g., to iteratively reduce the loss function).

Figure 5:
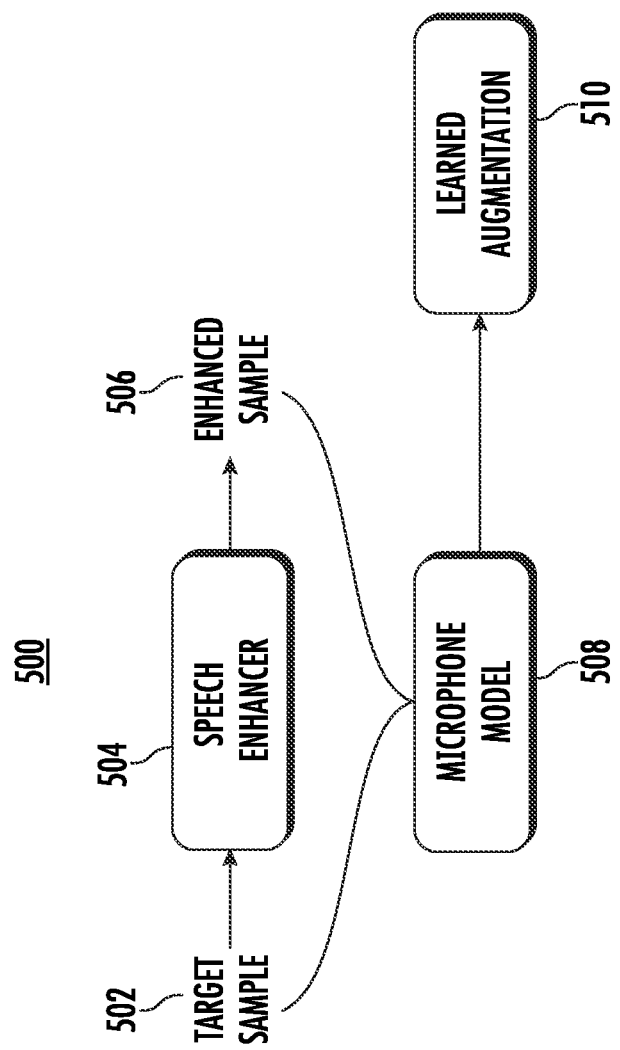
FIG. 5 depicts a block diagram of an example microphone model according to example embodiments of the present disclosure.

FIG. 5 depicts an overview of an example machine-learned microphone model system. The trained microphone model 508 can generate a learned augmentation 510 based on the target sample 502 (i.e., an item of sound data generated by a target microphone, e.g., a microphone with microphone variability) and the target sample's enhanced version 506 produced by the speech enhancement network 504.

More specifically, FIG. 5 depicts a block diagram of an example machine-learned microphone model 508 according to example embodiments of the present disclosure. In some implementations, the machine-learned microphone model 508 is trained to receive a set of input data 502 descriptive of a target sample from a target microphone and, as a result of receipt of the input data 502, provide output data 510 that includes augmented audio data (e.g., audio data augmented to transform the audio data to mimic an output from the target microphone). Thus, in some implementations, the machine-learned microphone model 508 can include an enhancer model 504 that is operable to perform speech enhancement techniques on the target sample 502 in order to generate an enhanced sample.

In some implementations, the systems and methods disclosed herein can obtain a target sample 502 descriptive of a target microphone. The target sample 502 may be processed by the enhancer model 504 to generate an enhanced sample 506. In some implementations, the enhancer model can include a speech enhancer network. The target sample 502 and the enhanced sample 506 can then be processed by the microphone model 508 to generate a learned augmentation output 510, which can include audio data augmented to mimic audio data generated by the target microphone.

Figure 9:
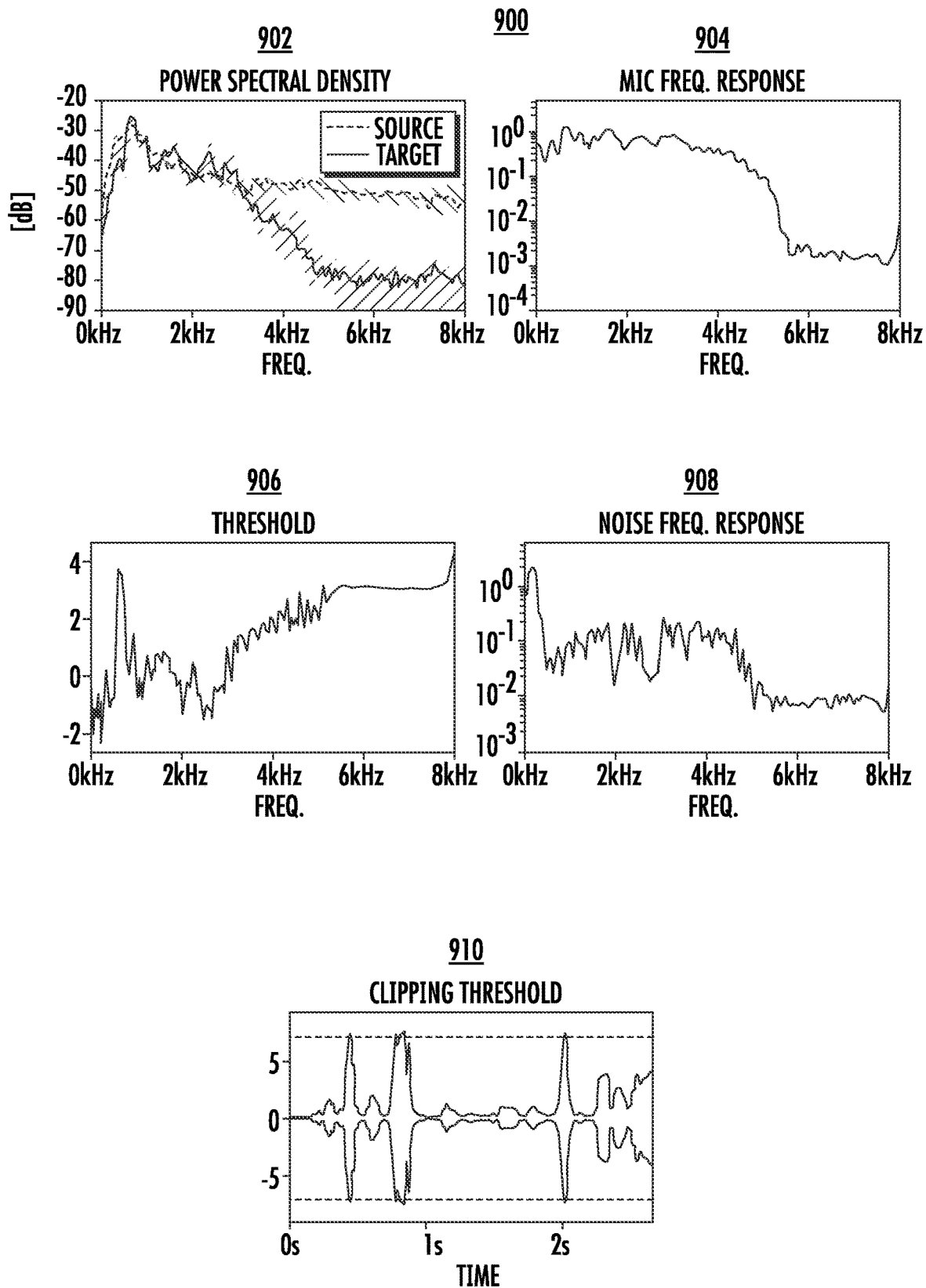
FIG. 9 depicts a block diagram of example learned parameters according to example embodiments of the present disclosure.

FIG. 9 depicts the power spectral density estimated from paired data of a mobile device and the parameters of a machine-learned microphone model. More specifically, the first graph 902 depicts a power spectral density graph, including a respective line for each of a source and a target, that can be utilized to compare the differences between the source and the target. A microphone model can then be trained to augment the source audio data to transform the source audio data into data that is descriptive of a target microphone (that can be, representative of audio data output by the target microphone). The second through fifth graphs depict different learned parameters including microphone frequency response parameters 904, frequency threshold parameters 906, noise frequency response parameters 908, and clipping threshold parameters 910.

Figure 10:
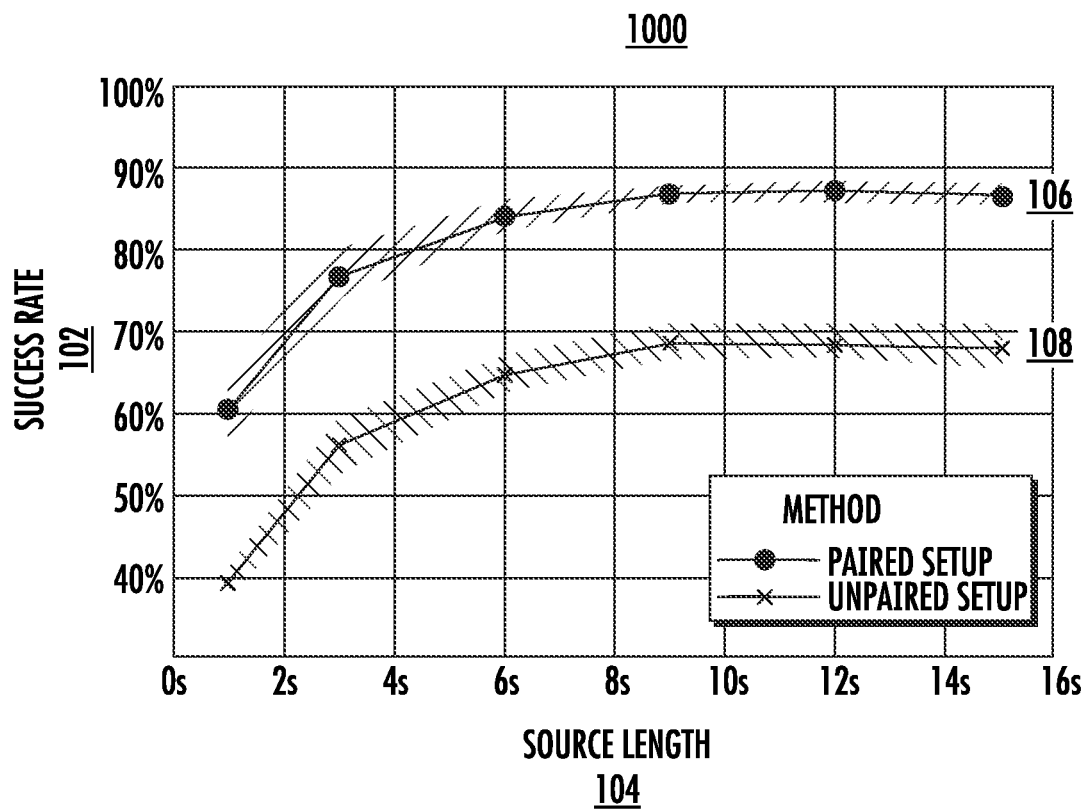
FIG. 10 depicts a block diagram of example machine-learned model results according to example embodiments of the present disclosure.

FIG. 10 depicts the effect of target audio length on the success rate of fooling a source device identification model, configured to receive an audio sample of sound from the target microphone having the target audio length, and output an indication of whether the audio sample was indeed generated by the target microphone. In particular, FIG. 10 depicts a graph 1000 with paired setup data 106 and unpaired setup data 108. As conveyed in the graph 1000, both paired setup data 106 and unpaired setup data 108 experience improved success rate 102 in response to increased sequence length 104 up to about nine second sequence lengths. Therefore, the systems and methods may provide improved performance as the sequence lengths are increased, with diminishing returns occurring around nine seconds of sequence length.

Example Methods

Figure 6:
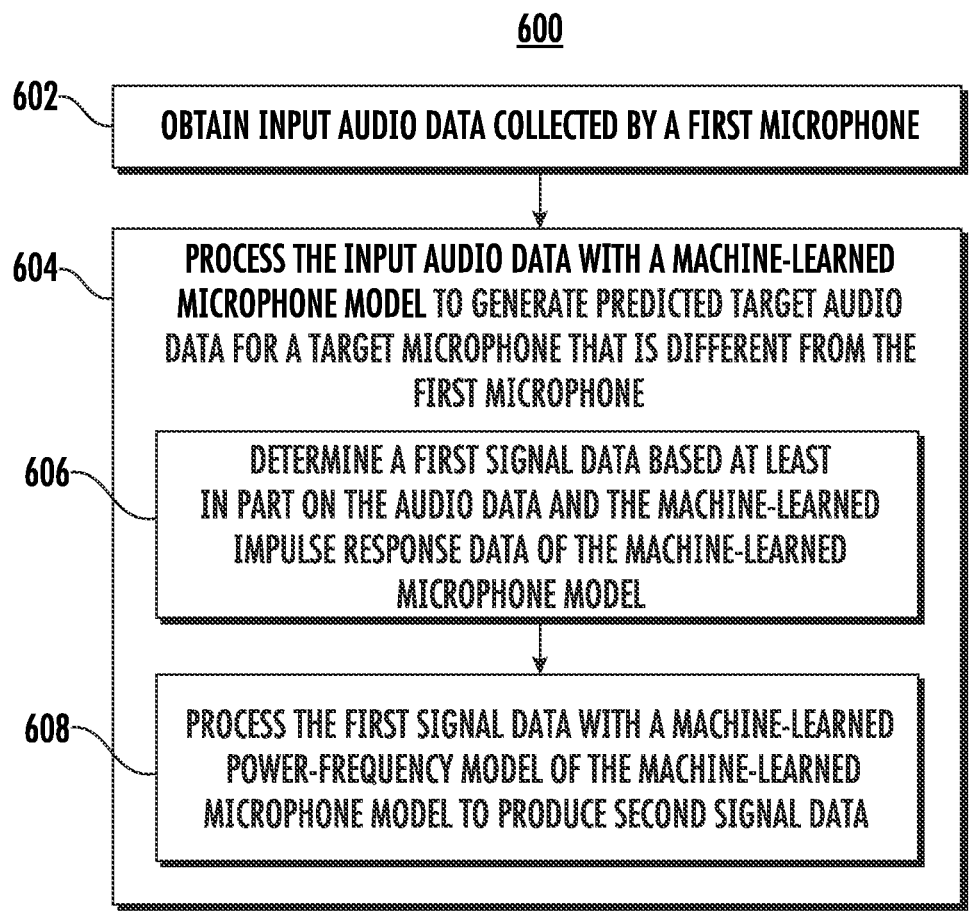
FIG. 6 depicts a flow chart diagram of an example method to perform target audio data prediction according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain input audio data collected by a first microphone.

At 604, the computing system can process the input audio data with a machine-learned microphone model to generate predicted target audio data for a target microphone that is different from the first microphone. In some implementations, the input audio data can include an unaugmented training example (i.e., audio data output by a microphone (e.g., a high quality microphone which outputs a substantially accurate representation of a sound signal is receives) different from the target microphone), and the predicted target audio data can include an augmented training example (i.e., modified audio data representative of audio output by the target microphone upon receiving the sound signal). Moreover, the system can train an audio processing model using the augmented training example.

In some implementations, processing the input audio data with a machine-learned microphone model to generate predicted target audio data for a target microphone that is different from the first microphone can include the computing system performing 606 and 608.

At 606, the computing system can determine a first signal data based at least in part on the audio data and machine-learned impulse response data of the machine-learned microphone model. In some implementations, the impulse response data can include room reverb impulse response data. The room reverb impulse response data can be based at least in part on a room where the target microphone is located.

At 608, the computing system can process the first signal data with a machine-learned power-frequency model of the machine-learned microphone model to produce second signal data. In some implementations, the machine-learned power-frequency model can model one or more frequency band cutouts. The one or more frequency band cutouts can be based at least in part on a power spectral density. Additionally and/or alternatively, the machine-learned power-frequency model may apply one or more short-term Fourier transforms. The machine-learned power-frequency model may include a sigmoid activation function.

In some implementations, processing the input audio data with a machine-learned microphone model can include processing a noise signal with a machine-learned filter to generate filtered noise data and combining the filtered noise data with the second signal data to generate third signal data. In some implementations, the noise signal can include a white Gaussian noise signal. The machine-learned clipping model may apply a learned maximum absolute value for a waveform. In some implementations, the machine-learned clipping model can include a smoothed minimum function and a smoothed maximum function.

Alternatively and/or additionally, processing the input audio data with a machine-learned microphone model can include processing the second signal or the third signal with a machine-learned clipping model to generate clipped data, in which the clipped data can include the predicted target audio data.

Figure 7:
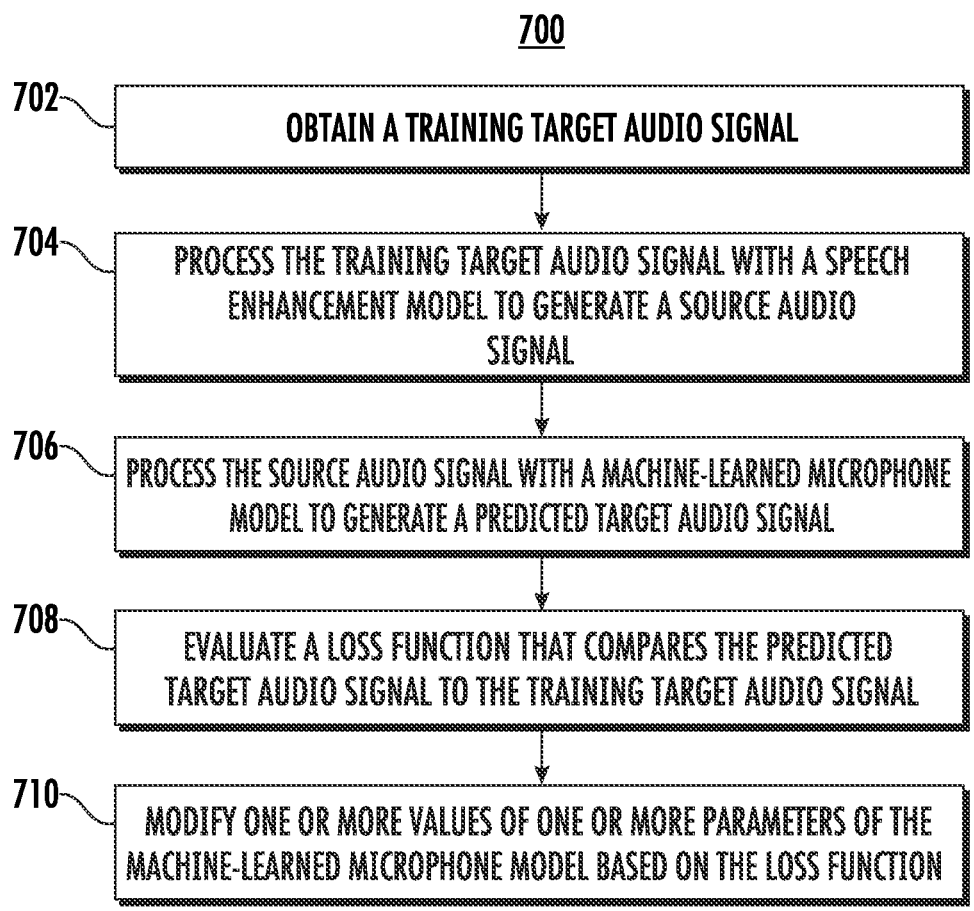
FIG. 7 depicts a flow chart diagram of an example method to perform machine-learned microphone model training according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a training target audio signal. Obtaining the training target audio signal can include obtaining a "raw audio" signal output by the target microphone, and/or can include augmenting audio data based at least in part on simulated microphone augmentation to generate simulated target data (that can be, audio data which is representative of audio data output by a target microphone). The simulated target data may be included in the training target audio signal.

At 704, the computing system can process the training target audio signal with a speech enhancement model to generate a source audio signal, representative of an audio signal output by a high-quality microphone. In some implementations, the source audio signal can include refined audio data (e.g., artefacts representative of shortcomings of the target microphone may be removed).

At 706, the computing system can process the source audio signal with a machine-learned microphone model to generate a predicted target audio signal.

At 708, the computing system can evaluate a loss function that compares the predicted target audio signal to the training target audio signal. In some implementations, evaluating the loss function can include generating a predicted target spectrogram from the predicted target audio signal, generating a training target spectrogram from the training target audio signal, and comparing the predicted target spectrogram with the training target spectrogram.

At 710, the computing system can modify one or more values of one or more parameters of the machine-learned microphone model based on the loss function (e.g., to reduce the loss function, e.g., by a backpropagation algorithm).

In some implementations, the computing system can employ the machine-learned microphone model to perform augmentations to a training dataset. Alternatively and/or additionally, the computing system can train a keyword recognition model using the augmented training dataset.

Figure 8:
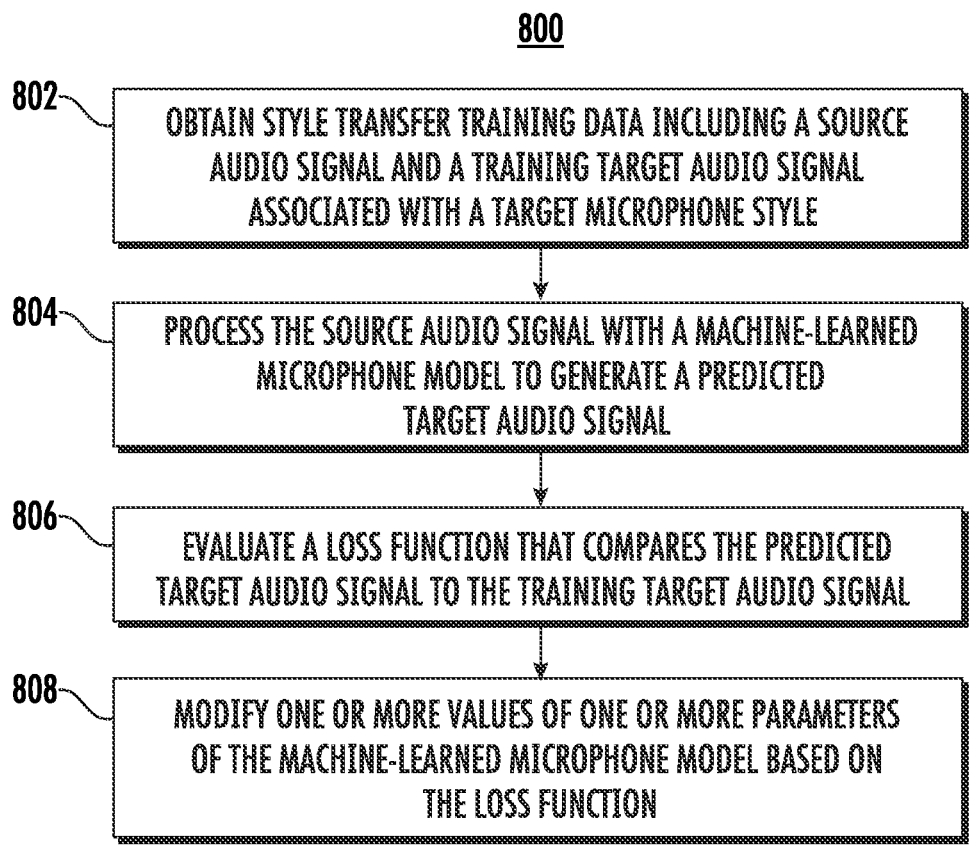
FIG. 8 depicts a flow chart diagram of an example method to perform machine-learned microphone model training according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain style transfer training data including a source audio signal and a training target audio signal associated with a target microphone style. The style transfer training data can indicate how the target microphone corrupts a sound signal it receives while generating audio data from the sound signal.

At 804, the computing system can process the source audio signal with a machine-learned microphone model to generate a predicted target audio signal (e.g., audio data representative of audio data output by the target microphone). The machine-learned microphone model can include one or more of a machine-learned impulse response, a machine-learned power-frequency model, a machine-learned noise input filter, or a machine-learned clipping function.

At 806, the computing system can evaluate a loss function that compares the predicted target audio signal to the training target audio signal. In some implementations, evaluating the loss function can include: generating a predicted target spectrogram from the predicted target audio signal, generating a training target spectrogram from the training target audio signal, and comparing the predicted target spectrogram with the training target spectrogram.

At 808, the computing system can modify one or more values of one or more parameters of the machine-learned microphone model based on the loss function (e.g., to reduce the loss function, e.g., by backpropagation).

Additionally and/or alternatively, the computing system can employ the machine-learned microphone model to perform augmentations to a training dataset. The augmented training datasets can then be stored in a training database for training other machine-learned models or for retraining the current machine-learned model.

In some implementations, the computing system can train a keyword recognition model using the augmented training dataset.

Example Implementations

Deployment of audio-based models "in-the-wild" can be influenced by the robustness of the transformations introduced by heterogeneous microphones. In some implementations, the systems and methods disclosed herein can perform one-shot microphone style transfer. Given only a few seconds of audio recorded by a target device, the systems and methods can identify the transformations associated with the microphone and can use the learned transformations to synthesize audio as if it were recorded by that device. The systems and methods can include a machine-learned microphone model that can apply the transformations to real audio and may significantly increase model robustness to microphone variability when used as data augmentation in downstream tasks.

In some implementations, the systems and methods can be utilized for tackling domain shift in the development of robust models. Concerning the robustness to microphone variability, the performance is significantly affected when inference is performed on audio captured by microphones that differ from the ones used for collecting the training set. To mitigate the performance issue of models when receiving audio data from a microphone different than the training microphone, the systems and methods may use additive corrections in the cepstral domain and multi-style training using a collection of microphones. However, that correction may be limited if training data from multiple microphones is not accessible.

Therefore, the systems and methods may solve the following problem, given a few seconds of audio recorded by a target microphone, transform other audio samples to sound as if they were recorded by the target microphone, with the use of a machine-learned microphone model. The systems and methods may be largely applicable to speech data and other audio data. In some implementations, the systems and methods can include a machine-learned microphone model for one-shot microphone style transfer. Operating in the time-domain, the systems and methods can be agnostic to the downstream tasks, and hence widely applicable. Moreover, the systems and methods can leverage a microphone model and speech enhancement techniques for enabling fast model identification. Additionally and/or alternatively, the machine-learned microphone model may leverage strong priors capturing a microphone signal processing pipeline to train the microphone model.

In some implementations, the systems and methods can include a lightweight microphone model based on strong priors, which can be trained using just a few seconds of audio from the target device. The computation operations and data storage requirement required to perform this operation may be within the capabilities of a modest mobile computing device. The machine-learned microphone model may output samples transformed by the learned microphone model that can fool a source device identification model. Moreover, the systems and methods can be utilized for data augmentation to significantly increase model robustness to microphone variability. Alternatively and/or additionally, the microphone model can be used in adversarial training to boost model robustness.

The systems and methods may obtain training data including: i) a collection of speech samples (e.g., output by a high-quality microphone which substantially may not add artefacts to a received sound signal), which can be referred to as a source, ii) a short speech segment recorded by a microphone of interest, which can be referred to as a target. The systems and methods can assume that the source samples contain clean speech samples, collected with a high-quality microphone with flat frequency response and only mildly affected by background noise and room reverberations. In some implementations, the output of the systems and methods can include a transformation that modifies the source samples to sound as if they were recorded by the target microphone.

An overview of an example system with a microphone model is depicted in FIG. 5. The first building block can be the speech enhancement network 504. In some implementations, the enhancement network can include a wave-to-wave fully convolutional U-Net. The speech enhancement network 504 can successfully extend frequencies lost due to microphone filtering, in removing noise, and even in removing early room reverberations. Therefore, the robustness to microphone transformations can be achieved with the speech enhancement network 504, by enhancing the samples before feeding them to a model serving a downstream task. However, running the speech enhancement network at inference time may introduce latency.

In some implementations, the output of the speech enhancer model may include one or more artifacts. Therefore, the systems and methods may further include a microphone model 508 that leverages strong priors in the signal processing pipeline of the microphone. The task of the machine-learned microphone model can be to identify the transformations introduced by a microphone from a pair of samples. The strong priors may be utilized to allow for model identification given only a few seconds of audio, even in the presence of artifacts possibly introduced by the enhancement network. Once the transformations have been identified, the transformations can be used for data augmentation during training to achieve robustness in the target domains.

Alternatively and/or additionally, the systems and methods can include learning the transformations directly from the target sample, without relying on the speech enhancement network. In some implementations, the systems and methods can be trained with time-aligned source-target sample pairs.

In some implementations, the systems and methods can be trained to transform the source samples to sound as if they were recorded by the target microphone. In some implementations, the microphone model may be evaluated via a series of downstream tasks (i.e., supervised learning problems that receive as input the output of the microphone style transfer).

The task of the microphone model may be to approximate the transformation T attributed to microphone variability based on a single pair ($x_{source}$, $x_{target}$) containing just a few seconds of speech, under the assumption that $x_{target}$=T($x_{source}$). In order to achieve this from a single, possibly short sample, the systems and methods may incorporate strong priors in modeling the microphone acquisition pipeline, yet flexible enough to achieve convincing experimental results.

An example microphone model is depicted in FIG. 3. As the first step of the pipeline, the input time-domain waveform $x \in \mathbb{R}^N$ can be convolved with the microphone impulse response (IR) $f_m$:

$$y_1 = f_m * x. \qquad (1)$$

Hence, with a slight abuse of nomenclature, the composition of the microphone impulse response with the room impulse response can be denoted as $f_m$. Since the microphone model can handle variable-sized inputs of the order of thousands of samples, the systems and methods may perform all the convolutions as multiplications in the frequency domain with time complexity $\mathcal{O}(N \log N)$.

As the second step, the signal $y_1$ can be passed through a component that models frequency band cutouts of the microphone based on the power spectral density (PSD): when the signal power in a frequency band is lower than a learned threshold, the respective power may be further decreased in that band. Formally, $$y_2 = STFT^{-1} \, STFT(y_1) \cdot \sigma(|STFT(y_1)|^2 - t), \qquad (2)$$

where $\sigma(\cdot)$ is the sigmoid function and t is broadcast over time, having dimension corresponding to the STFT window length. Next, the system may sample a white Gaussian noise signal that is convolved with a learned filter $f_n$ and added to $y_2$ to produce $y_3$, $$y_3 = y_2 + f_n \in, \in \sim \mathcal{N}(0,1). \qquad (3)$$

The last component may model the microphone clipping effect by learning a threshold for the maximum allowed absolute value for the waveform. The systems and methods may achieve this via smoothed min and max functions, that is:

$$y = \text{smoothmin}(\text{smoothmax}(y_3, -\tau), \tau), \qquad (4)$$

where $\text{smoothmax}(a, b) = (ae^a + be^b)/(e^a + e^b)$ and $\text{smoothmax}(a, b) = (ae^{-a} + be^{-b})/(e^{-a} + e^{-b})$. Moreover, the set of learnable parameters may be denoted as $\theta = \{f_m, f_n, t, \tau\}$ and the resulting microphone transformation as $\text{mic}_\theta(\cdot)$.

The parameters of the microphone model may be optimized after obtaining just a few seconds of paired audio samples ($x_{source}$, $x_{target}$). For training, the systems and methods may perform gradient descent on the objective $$\min_\theta \ell_1(MEL(\text{mic}_\theta(x_{source})) MEL(x_{target})), \qquad (5)$$

where $\ell_1(\cdot,\cdot)$ denotes the mean absolute error and MEL($\cdot$) computes the mel spectrogram. All signals may be assumed to be sampled at 16 KHz. The mel spectrogram can be calculated with a window length of 1024 samples (64 ms) and a hop length of 160 (10 ms) and with 128 bins. The optimization may be performed with a training dataset using step size 0.005 and 1000 iterations, which can be performed in less than a minute on a single GPU due to the small number of parameters. For the microphone model, the systems and methods may include fixing the STFT window length to 2048 (128 ms) and hop length to 160 in the experiments. Both the speech enhancement network and the microphone model may operate on gain normalized signals. As an illustration, FIG. 9 shows example parameters of the microphone model learned from a single audio sample in the MOBIPHONE dataset.

The estimation of the microphone model can assume that the input audio $x_{source}$ represents a clean original waveform. Alternatively and/or additionally, a speech enhancement network can produce an approximation $\hat{x}_{source} = E(x_{target})$, by enhancing the sample $x_{target}$ by inverting the microphone transformations encountered in the target domain and thus producing a sample containing clean speech. Since $x_{target}$ may possibly be affected by noise, microphone filtering and room reverberations, the task of the network may be to perform both blind deconvolution and denoising.

Therefore, the training data of the speech enhancement network can cover a wide variety of possible transformations. In some implementations, the systems and methods can create a synthetic dataset. For example, the clean reference audio may contain sentences from 56 native English speakers, split into sequences of 1 seconds. Each sequence can then be modified by applying randomly sampled transformations represented by our microphone model. While the microphone model can capture sophisticated transformations, its modular construction based on strong priors allows the system to sample each of the components presented in FIG. 3 individually. The task of the speech enhancement network can be to learn to invert in order to apply transformation based on the pair of transformed and clean reference sample.

In some implementations, the systems and methods can obtain a set of 70 microphone impulse responses from a training dataset, complemented with a set of 200 band-pass filters with cutoff frequencies uniformly sampled from [50 Hz, 150 Hz] and [3 kHz, 8 kHz], respectively. Next, the systems and methods may obtain a set of 1000 room reverberation impulse responses by running a room simulator based on the image-source method on rooms of diverse geometry. Finally, the systems and methods may involve extracting 10,000 noise segments from a speech commands dataset, by applying an extraction method (i.e., by looking for short low-energy segments of 100 ms length and replicating them (randomizing the phase) with overlap-and-add to obtain samples of 1 second, thus matching the length used during training).

Equipped with these collections, the systems and methods can create a parallel corpus by applying the following operations to each VCTK minibatch: i) convolve a clean sample with a randomly chosen room reverb impulse response; ii) convolve the result with a randomly chosen microphone impulse response; iii) perform thresholding of the resulting signal using Eq. (2), by dividing the frequency range into 8 equal buckets and for each bucket sampling the thresholds uniformly at random from the range [2, 3]; iv) add a randomly chosen noise sample with adjusting the gain such in the resulting SNR is in the range [5 dB, 30 dB]; and, finally, v) perform clipping using Eq. (4) where i is chosen randomly between the half and the maximum absolute time-domain signal value. Each of the previous operations can be performed independently with probabilities 0.8, 0.9, 0.6, 0.9 and 0.1, where the values have been chosen to ensure diversity in the resulting transformations.

The architecture of the enhancement network can include a fully-convolutional wave-to-wave U-Net identical to the audio-only version of a media training dataset. Additionally and/or alternatively, minimizing a loss function can involve optimizing a combination of an adversarial loss and a feature matching loss, where features are extracted from the intermediate activations of a multi-scale discriminator.

The systems and methods can present a novel non-linear microphone model that can be learned from a few seconds of paired audio. Based on the microphone model and a speech enhancement network, the systems and methods may include a machine-learned microphone model that can identify the microphone transformations in an unpaired setup. The microphone model coupled with adversarial training can be used to improve robustness without relying on data from the target device. The systems and methods can be evaluated based on the quality of the style transfer by means of downstream tasks, and the results can show that the method significantly outperforms existing baselines.

Example Experiments

To evaluate the quality of the samples produced by an example microphone model (e.g., MicAugment), an experiment system can leverage two different downstream tasks, namely: i) fooling a source device identification model and ii) evaluating the robustness a fully supervised model trained with different augmentation strategies. While this evaluation method can be inherently dependent on the models used in the downstream tasks, the evaluation can find that the relative ordering of the competing methods is preserved across different tasks.

The system can consider the problem of identifying a mobile device from the footprints left by its microphone, which can be a topic of interest in audio forensics. In this experiment, the system may first train a fully supervised source device identification model. Then, given only a few seconds of audio from a target mobile device, the system may train MicAugment and apply it to clean samples, with the goal of fooling the source device identification model to believe that they were taken from the target device.

For this task, the system may rely on a training dataset that records sentences of 12 male and 12 female speakers randomly chosen from a TIMIT database with 21 mobile devices, resulting in 30 seconds of audio per speaker and device. The dataset may specify the original sentences from TIMIT used in the recording, based on which the system may create a paired and aligned TIMIT-MOBIPHONE dataset. The joint dataset can allow the system to evaluate our microphone model in isolation on a real world dataset.

In some implementations, the system can start by training a source device identification network on MOBIPHONE. The system may split the dataset into train and test sets with non-overlapping sets of 16 and 8 speakers. Moreover, there may be no overlap between the sentences uttered in the train and test splits. For training, the audio can be split into chunks of one second. For testing, the system can report both the average accuracy over one-second chunks as well as the accuracy when majority voting is applied for each speaker and device. The model architecture can include a CNN that operates on log-mel spectrogram inputs (window length 25 ms, hop length: 10 ms, 64 mel-channels). Additionally and/or alternatively, the network can include a sequence of six convolutional blocks, each consisting of separable convolutions along the time and the frequency axes with kernel size equal to 3 and followed by a ReLU non-linearity, interleaved with batch normalization. The number of channels in each block may be equal to [64, 128, 256, 256, 512, 512]. Max pooling with a stride of 2 along both time and frequency can be applied when the number of channels is increased. The convolutional body can be followed by a head with two layers: a fully connected layer with 256 outputs with ReLU non-linearity, and a final linear layer with 20 outputs. The results in Table I can convey a slight improvement over the results of other techniques and confirm that the model generalizes well, producing perfect classification accuracy with majority voting for unseen speakers and content.

More specifically, Table I conveys experimental results of device identification with CNN on a MOBIPHONE dataset.

| DEVICE IDENTIFICATION WITH CNN ON MOBIPHONE | |
| --- | --- |
| Test Accuracy (chunks of 1 s) | Test Accuracy (Majority Voting/Speaker) |
| 99.2 | 100 |

For constructing the baselines, the system may sample a new set STIMIT of 100 random speakers from TIMIT and retrieve a random sentence with an average length of 3 seconds for each speaker. The goal of the attack methods can propose transformations for each target device, such that when applied to $S_{TIMIT}$, the transformed samples can be misclassified by the CNN as belonging to the target device. The system may report the success rate averaged over both the devices and the samples in $S_{TIMIT}$. Moreover, the system may devise baselines that serve as lower and upper bounds for MicAugment. The strongest baseline establishing an upper bound on the success rate can be a white-box attack (i.e., an attack that has access to the trained source device identifier model and can back-propagate gradients through it). However, instead of the common approach of perturbing the input samples in feature space, the system may adversarially optimize the microphone model to fool the device detector. More formally, for a target device class c, the attacker's objective can be:

$$\min_\theta \sum_{x \in S_{TIMIT}} \ell(g(mic_\theta(x)), c), \quad (6)$$

where $g(\cdot)$ is the device detector CNN and $\ell(\cdot,\cdot)$ is the cross-entropy loss. The success of such a method can also serve as validation for the flexibility of the microphone model. By listening to the adversarial samples, the system can be able to verify that the attack does not alter the semantic content of the speech.

In some implementations, the systems and methods can include two baselines that rely on the paired and aligned TIMIT-MOBIPHONE datasets. For training these, the system may select 15 seconds of paired audio for each device, containing one sentence from 5 speakers chosen at random. The first baseline relying on paired data can be spectral equalization (i.e., a calibration method based on the power spectral density (PSD) ratios estimated from the TIMIT and MOBIPHONE batches: the method adjusts the PSD of $S_{TIMIT}$ to match the PSD of the samples from the target device, hence capturing only linear transformations). The second paired baseline can be learning the microphone transformation model from only the 15 seconds of available paired data for each device. Moreover, the evaluation can include a showcase of the MicAugment, that works in the unpaired setup and has only access to the target device recordings.

Additionally and/or alternatively, the system can gain several insights about the quality of the transferred samples from the results in Table II. The table can convey the mean and standard deviation of the rate over 5 different randomly chosen $S_{TIMIT}$ batches and initializations with different random seeds. The success of the white-box attack can prove the flexibility of our model. This can be further consolidated by the fact that, in the paired setup, the microphone model learns a transformation that fools the device detector with 88.3% success rate, although being oblivious to the classification task at hand. Finally, MicAugment can succeed 68.3% of the times when provided with only 15 seconds of audio samples from each target device. The result of this study can indicate that the 20% of accuracy drop compared to the paired setup can be due to the speech enhancement network, which faces real data transformation not encountered during training time. A collection of source and target samples, as well as samples transformed with MicAugment, can be provided. The evaluation can include performing an ablation study on the effect of the length of audio data available from the target device on the success rate of fooling the device identification model. The results are shown in FIG. 10, where it can be observed that the peak performance can be reached with 9 seconds of audio from the target device. It can be noted that the 20% gap between the paired and unpaired setup due to the speech enhancement network may be constant over different target audio length.

The accuracy degradation due to microphone variability in a keyword detection system can be mitigated by the use of a microphone model (e.g., the MicAugment system). In some implementations, the evaluation of a MicAugment system can include (1) a synthetic setup, in which the test set is synthetically transformed via the microphone models learned in the previous section on the TIMIT-MOBIPHONE paired setup (e.g., the models can be used as proxy of real microphone transformations.) and (2) a real setup, in which the test set is recaptured playing the audio clips with computer loudspeakers and recording them with the built-in microphone.

Table III conveys the performance of different approaches for tackling microphone variability on keyword detection.

|  | No augm. | Spectral Eq. | SpecAugment | Speech enh. Only | Adv. Augm. | MicAugment | Training with oracle augm. |
| --- | --- | --- | --- | --- | --- | --- | --- |
| Test acc. | 95.7 ± 0.2 | 95.8 ± 0.1 | 96.1 ± 0.1 | 95.8 ± 0.1 | 95.3 ± 0.2 | 95.4 ± 0.2 | 95.4 ± 0.1 |
| Test acc. on transf. test set | 91.8 ± 0.3 | 92.5 ± 0.1 | 92.4 ± 0.2 | 79.8 ± 0.3 | 93.6 ± 0.2 | 93.8 ± 0.1 | 94.5 ± 0.1 |
| Recovered accuracy % | 0 | 25 | 20.5 | 0 | 65 | 71.6 | 100 |
| Test acc. on re-rec. test set | 88.3 ± 0.3 | 89.3 ± 1.6 | 89.0 ± 0.2 | 67.2 ± 0.2 | 90.0 ± 0.3 | 90.3 ± 0.2 | 91.0 ± 0.3 |
| Recovered accuracy % | 0 | 35.6 | 26.1 | 0 | 60.6 | 73 | 100 |

Table II conveys the success rates of various methods for style transfer in fooling a device identifier network.

| Method | Success Rate |
| --- | --- |
| White-box attack | 100.0 ± 0.0 |
| Spectral Equalization | 34.4 ± 1.3 |
| Microphone Model (Supervised) | 88.3 ± 0.6 |
| MicAugment | 68.3 ± 2.4 |

Table III (first column) shows that the accuracy drops from 95.7% to either 91.8% or 88.3% depending on the test scenario. The results can be reported as averaged over 5 random seeds. To obtain an upper bound on the accuracy achievable during test, the system can learn an oracle model which jointly leverages during training the same augmentations applied at test time, namely: (i) all transformations in the synthetic setup and (ii) microphone models learned from 10 seconds of paired audio from the re-recorded test set. Table III (last column) shows that this model can achieve a similar level of accuracy on the clean test set (95.4% vs.

95.7%), but it is significantly more robust on both modified test sets (94.5% vs. 91.8%, 91.0% vs. 88.3%).

The results show that the accuracy loss can be significantly recovered by augmenting the training data with MicAugment, which can be learned from only 15 seconds of data from the target device. In the synthetic setup, the system can use the MicAugment models learned in the unpaired setup for each target device from the previous experiment. In the real setup, the system can train MicAugment using a 15 second clip from a training dataset, recaptured via a computer. The system can use the dataset instead of speech commands to learn the microphone model in this case, because the latter already contains significant degradations due to the recording microphones. The MicAugment column in Table III shows the average accuracy achieved when using an augmentation method during training, which approaches the level of accuracy achievable with an oracle model.

In addition, the evaluation can be utilized to compare MicAugment with other methods that can operate in an unpaired setup, namely spectral equalization and SpecAugment. For spectral equalization, the system can estimate the power spectral density ratios between clean samples in STIMIT and, respectively, 15 seconds of audio for each target device in the synthetic setup, or 100 seconds of a random sample from the training dataset and the 15 seconds of re-recorded portion of the training dataset. For SpecAugment, the system can be used for configuration that masks 2 slices in both the time and frequency domain, each with up to 10 elements.

Overall, the results can be conveyed in Table III that spectral equalization recovers 25% of accuracy loss in the synthetic setup and 35% in the real setup. SpecAugment may be oblivious to the specific distortion applied to the test samples, nevertheless it can still recover 20% and 26% of the accuracy loss, respectively, while achieving quality accuracy on the original clean test set. In contrast, MicAugment can recover more than 70% of accuracy loss, with only a small degradation on the clean test set.

Finally, the evaluation results show that the microphone model can be used to achieve robustness to a wide range of possible microphone transformations, without using any samples from the target devices. This can include the knowledge of the supervised downstream task and the corresponding labeled dataset.

While in the image domain, adversarial attacks can be conducted by perturbing the pixel values, here the systems can perform attacks by optimizing our microphone model instead, similarly to the white-box attack to source device identification. The downstream task may be a K-class classification task of learning the classifier $g_\phi$ on the dataset $\mathcal{D} = (x_1, y_1), \ldots, (x_n, y_n)$. The system may include the following optimization objective:

$$\min_\phi \mathbb{E}_{(x,y) \sim \mathcal{D}} \mathbb{E}_{c \sim \mathcal{U}\{K\}} [G(x, y, c, \phi)], \text{ where} \quad (7)$$

$$G(x, y, c, \phi) := \ell(g_\phi(mic_{\theta^*}(x)), y) \text{ s.t.} \quad (8)$$

$$\theta^* = \operatorname*{argmin}_{\theta \in C} \ell(g_\phi(mic_\theta(x)), c)$$

where $\ell(\cdot, \cdot)$ is the cross-entropy loss and C is the constraint set on the microphone model parameters. Informally, for each input sample, the system may find the parametrization of the microphone model that fools the classifier to misclassify the sample to the class $c \sim \mathcal{U}\{K\}$ sampled uniformly at random.

The set C can define the constrains of the microphone model parameters, and the set can be carefully selected. In the image domain, the adversarial constraint set can be commonly defined as an $l_p$ norm constraint in the pixel space. Instead, the system can initialize $\theta_0$ in the inner optimization problem of Eq. (8) to be equivalent to the identity transformation and can perform a limited number of gradient descent steps to find $\theta$. (we used 50 steps in our experiments). The evaluation can be used to inspect such adversarial microphone transformations and can convey that the speech content in the resulting transformed samples remains semantically unaltered, and it can be easily correctly classified by human listeners.

The systems and methods may be evaluated on both the synthetic and real setup of the previous experiment and report the results in the Adv. Augm. column of Table III.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for microphone-style transfer, the method comprising:
   obtaining, by a computing system comprising one or more computing devices, input audio data collected by a first microphone; and
   processing, by the computing system, the input audio data with a machine-learned microphone model to generate predicted target audio data for a target microphone that is different from the first microphone;
   wherein processing, by the computing system, the input audio data with the machine-learned microphone model comprises:
   determining, by the computing system, first signal data based at least in part on the input audio data and machine-learned impulse response data of the machine-learned microphone model;

processing, by the computing system, the first signal data with a machine-learned power-frequency model of the machine-learned microphone model to produce second signal data, wherein the machine-learned power-frequency model adjusts signal power of one or more frequency band cutouts of the first signal data;
obtaining target audio signal associated with the target microphone;
processing the target audio signal with a speech enhancement model to generate an enhanced sample;
generating a learned augmentation output based on processing the target audio signal and the enhanced sample with the machine-learned microphone model; and
generating the predicted target audio data for the target microphone based on the second signal data and the learned augmentation output.

2. The computer-implemented method of claim 1, wherein processing, by the computing system, the input audio data with the machine-learned microphone model further comprises:
processing, by the computing system, a noise signal with a machine-learned filter to generate filtered noise data; and
combining, by the computing system, the filtered noise data with the second signal data to generate third signal data.

3. The computer-implemented method of claim 2, wherein the noise signal comprises a white Gaussian noise signal.

4. The computer-implemented method of claim 1, wherein processing, by the computing system, the input audio data with the machine-learned microphone model further comprises:
processing, by the computing system, the second signal with a machine-learned clipping model to generate clipped data, wherein the clipped data comprises the predicted target audio data.

5. The computer-implemented method of claim 4, wherein the machine-learned clipping model applies a learned maximum absolute value for a waveform.

6. The computer-implemented method of claim 4, wherein the machine-learned clipping model comprises a smoothed minimum function and a smoothed maximum function.

7. The computer-implemented method of claim 1, wherein the input audio data comprises an unaugmented training example and the predicted target audio data comprises an augmented training example, and wherein the method further comprises training an audio processing model using the augmented training example.

8. The computer-implemented method of claim 1, wherein the impulse response data comprises room reverb impulse response data, wherein the room reverb impulse response data is based at least in part on a room where the target microphone is located.

9. The computer-implemented method of claim 1, wherein the machine-learned power-frequency model applies one or more short-term Fourier transforms.

10. The computer-implemented method of claim 1, wherein the one or more frequency band cutouts are based at least in part on a power spectral density.

11. The computer-implemented method of claim 1, wherein the machine-learned power-frequency model comprises a sigmoid activation function.

12. A computer system, comprising:
one or more processors;
one or more non-transitory computer readable media that collectively store instructions that, when executed by the one or more processors, cause the computing system to perform operations, the operations comprising:
obtaining input audio data collected by a first microphone; and
processing the input audio data with a machine-learned microphone model to generate predicted target audio data for a target microphone that is different from the first microphone;
wherein processing the input audio data with the machine-learned microphone model comprises:
determining, by the computing system, first signal data based at least in part on the input audio data and machine-learned impulse response data of the machine-learned microphone model;
processing, by the computing system, the first signal data with a machine-learned power-frequency model of the machine-learned microphone model to produce second signal data, wherein the machine-learned power-frequency model adjusts signal power of one or more frequency band cutouts of the first signal data;
obtaining target audio signal associated with the target microphone;
processing the target audio signal with a speech enhancement model to generate an enhanced sample;
generating a learned augmentation output based on processing the target audio signal and the enhanced sample with the machine-learned microphone model; and
generating the predicted target audio data for the target microphone based on the second signal data and the learned augmentation output.

13. The system of claim 12, wherein adjusting signal power of the one or more frequency band cutouts of the first signal data comprises:
modeling, with the machine-learned power-frequency model of the machine-learned microphone model, non-linearity of a device audio processing pipeline by frequency band cutouts.

14. The system of claim 13, wherein the modeling is performed based on power spectral density.

15. The system of claim 12, wherein adjusting signal power of the one or more frequency band cutouts of the first signal data comprises:
determining signal power in a frequency band is below a learned threshold; and
decreasing the signal power for the frequency band based on the signal power in the frequency band being below a learned threshold.

16. One or more non-transitory computer readable media that collectively store instructions that, when executed by one or more processors, cause a computing system to perform operations, the operations comprising:
obtaining input audio data collected by a first microphone; and
processing the input audio data with a machine-learned microphone model to generate predicted target audio data for a target microphone that is different from the first microphone;
wherein processing the input audio data with the machine-learned microphone model comprises:
determining, by the computing system, first signal data based at least in part on the input audio data and machine-learned impulse response data of the machine-learned microphone model;

processing, by the computing system, the first signal data with a machine-learned power-frequency model of the machine-learned microphone model to produce second signal data, wherein the machine-learned power-frequency model adjusts signal power of one or more frequency band cutouts of the first signal data;

obtaining target audio signal associated with the target microphone;

processing the target audio signal with a speech enhancement model to generate an enhanced sample;

generating a learned augmentation output based on processing the target audio signal and the enhanced sample with the machine-learned microphone model; and generating the predicted target audio data for the target microphone based on the second signal data and the learned augmentation output.

17. The one or more non-transitory computer readable media of claim 16, wherein the second signal data is further processed with a machine-learned clipping model that models a microphone clipping effect.

18. The one or more non-transitory computer readable media of claim 17, wherein the microphone clipping effect is modeled by learning a threshold for a maximum allowed absolute value for a waveform.

19. The one or more non-transitory computer readable media of claim 16, wherein the microphone model comprises the machine-learned power-frequency model, a machine-learned impulse response model, a machine-learned noise input filter, and a machine-learned clipping model.

* * * * *